(12) United States Patent
Walker et al.

(10) Patent No.: US 7,756,746 B2
(45) Date of Patent: *Jul. 13, 2010

(54) METHOD AND APPARATUS FOR SELLING AN AGING FOOD PRODUCT

(75) Inventors: Jay S. Walker, Ridgefield, CT (US); Andrew S. Van Luchene, New York, NY (US); Jonathan Otto, Stamford, CT (US); Daniel E. Tedesco, Huntington, CT (US); Geoffrey M. Gelman, Stamford, CT (US)

(73) Assignee: Walker Digital LLC, Stamford, CT (US)

( * ) Notice: Subject to any disclaimer, the term of this patent is extended or adjusted under 35 U.S.C. 154(b) by 541 days.

This patent is subject to a terminal disclaimer.

(21) Appl. No.: 11/621,422

(22) Filed: Jan. 9, 2007

(65) Prior Publication Data

US 2007/0150378 A1 Jun. 28, 2007

Related U.S. Application Data

(63) Continuation of application No. 09/858,458, filed on May 16, 2001, now Pat. No. 7,184,990, which is a continuation-in-part of application No. 09/083,483, filed on May 22, 1998, now Pat. No. 6,298,331, which is a continuation-in-part of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
*G06Q 99/00* (2006.01)
(52) U.S. Cl. .......................... 705/15; 705/1.1; 705/27; 705/28; 62/127; 221/150
(58) Field of Classification Search .................. 705/1, 705/15–16, 27–28, 400; 221/150; 62/127
See application file for complete search history.

(56) References Cited

U.S. PATENT DOCUMENTS

RE25,600 E    6/1964   Goldwater et al.   ............. 178/4

(Continued)

FOREIGN PATENT DOCUMENTS

DE        40 09 980 A1      1/1991

(Continued)

OTHER PUBLICATIONS

Lang, Joan, "Round 'n' Round They Go", May 1, 1996, Restaurant Business; vol. 95 Issue 7, p. 132, 2p.*

(Continued)

*Primary Examiner*—John W Hayes
*Assistant Examiner*—Freda A Nelson
(74) *Attorney, Agent, or Firm*—Fincham Downs LLC

(57) ABSTRACT

Some embodiments provide methods and apparatus for determining a food product and determining a price range defining a maximum price and a minimum price. An indication is stored that the food product may be offered, as a set of one or more food products, in exchange for a round-up amount associated with a purchase, if the round-up amount is in the price range.

22 Claims, 17 Drawing Sheets

U.S. PATENT DOCUMENTS

| | | | |
|---|---|---|---|
| 3,222,189 A | 12/1965 | Perozzi | 99/172 |
| 3,573,747 A | 4/1971 | Adams et al. | |
| 3,637,999 A | 1/1972 | Pappas | 235/94 A |
| 4,030,632 A | 6/1977 | Harashima | 221/150 A |
| 4,108,361 A | 8/1978 | Krause | |
| 4,120,452 A | 10/1978 | Kimura et al. | 235/381 |
| 4,323,770 A | 4/1982 | Dieulot et al. | |
| 4,441,160 A | 4/1984 | Azcua et al. | |
| 4,494,197 A | 1/1985 | Troy et al. | |
| 4,500,880 A | 2/1985 | Gomersall et al. | |
| 4,669,730 A | 6/1987 | Small | |
| 4,677,553 A | 6/1987 | Roberts et al. | |
| 4,689,742 A | 8/1987 | Troy et al. | |
| 4,723,212 A | 2/1988 | Mindrum et al. | |
| 4,760,247 A | 7/1988 | Keane et al. | |
| 4,764,666 A | 8/1988 | Bergeron | 235/380 |
| 4,815,741 A | 3/1989 | Small | |
| 4,825,045 A | 4/1989 | Humble | |
| 4,839,507 A | 6/1989 | May | |
| 4,854,590 A | 8/1989 | Jolliff et al. | |
| 4,859,838 A | 8/1989 | Okiharu | |
| 4,876,592 A | 10/1989 | Von Kohorn | |
| 4,882,473 A | 11/1989 | Bergeron et al. | |
| 4,902,880 A | 2/1990 | Garczynski et al. | |
| 4,908,761 A | 3/1990 | Tai | |
| 4,910,672 A | 3/1990 | Off et al. | |
| 4,922,522 A | 5/1990 | Scanlon | |
| 4,937,853 A | 6/1990 | Brule et al. | |
| 4,973,952 A | 11/1990 | Malec et al. | |
| 4,982,337 A | 1/1991 | Burr et al. | |
| 4,993,714 A | 2/1991 | Golightly | |
| 5,025,372 A | 6/1991 | Burton et al. | |
| 5,053,957 A | 10/1991 | Suzuki | 364/405 |
| 5,056,019 A | 10/1991 | Schultz et al. | |
| 5,119,295 A | 6/1992 | Kapur | |
| 5,128,862 A | 7/1992 | Mueller | |
| 5,132,914 A | 7/1992 | Cahlander et al. | |
| 5,172,328 A | 12/1992 | Cahlander et al. | |
| 5,173,851 A | 12/1992 | Off et al. | |
| 5,177,342 A | 1/1993 | Adams | |
| 5,192,854 A | 3/1993 | Counts | |
| 5,193,056 A | 3/1993 | Boes | 705/36 |
| 5,200,889 A | 4/1993 | Mori | 364/401 |
| 5,201,010 A | 4/1993 | Deaton | |
| 5,216,595 A | 6/1993 | Protheroe | |
| 5,223,698 A | 6/1993 | Kapur | |
| 5,231,569 A | 7/1993 | Myatt et al. | |
| 5,235,509 A | 8/1993 | Mueller et al. | |
| 5,239,165 A | 8/1993 | Novak | |
| 5,243,515 A | 9/1993 | Lee | |
| 5,245,533 A | 9/1993 | Marshall | |
| 5,256,863 A | 10/1993 | Ferguson et al. | |
| 5,260,553 A | 11/1993 | Rockstein et al. | 235/462 |
| 5,262,941 A | 11/1993 | Saladin et al. | |
| 5,269,521 A | 12/1993 | Rossides | 273/138 R |
| 5,274,547 A | 12/1993 | Zoffel et al. | |
| 5,283,731 A | 2/1994 | Lalonde et al. | |
| 5,287,268 A | 2/1994 | McCarthy | |
| 5,297,026 A | 3/1994 | Hoffman | |
| 5,297,031 A | 3/1994 | Gutterman et al. | |
| 5,302,811 A | 4/1994 | Fukatsu | |
| 5,305,195 A | 4/1994 | Murphy | |
| 5,309,355 A | 5/1994 | Lockwood | |
| 5,327,508 A | 7/1994 | Deaton et al. | 382/7 |
| 5,353,218 A | 10/1994 | DeLapa et al. | |
| 5,353,219 A | 10/1994 | Mueller et al. | |
| 5,355,327 A | 10/1994 | Stent et al. | 364/551 |
| 5,371,345 A | 12/1994 | LeStrange et al. | 235/380 |
| 5,371,796 A | 12/1994 | Avarne | |
| 5,380,991 A | 1/1995 | Valencia et al. | |
| 5,398,932 A | 3/1995 | Eberhardt et al. | 273/138 A |
| RE34,915 E | 4/1995 | Nichtberger et al. | |
| 5,408,210 A | 4/1995 | Oka | 340/286 |
| 5,417,424 A | 5/1995 | Snowden et al. | 273/138 A |
| 5,420,606 A | 5/1995 | Begum et al. | |
| 5,428,606 A | 6/1995 | Moskowitz | |
| 5,440,108 A | 8/1995 | Tran et al. | 235/381 |
| 5,450,938 A | 9/1995 | Rademacher | 194/206 |
| 5,459,306 A | 10/1995 | Stein et al. | |
| 5,465,085 A | 11/1995 | Caldwell et al. | 340/825 |
| 5,481,094 A | 1/1996 | Suda | |
| 5,491,326 A | 2/1996 | Marceau et al. | 235/381 |
| 5,502,636 A | 3/1996 | Clarke | 364/401 |
| 5,504,475 A | 4/1996 | Houdou et al. | |
| 5,504,675 A | 4/1996 | Cragun et al. | 364/401 |
| 5,510,979 A | 4/1996 | Moderi et al. | |
| 5,521,364 A | 5/1996 | Kimura et al. | |
| 5,526,257 A | 6/1996 | Lerner | 364/401 |
| 5,528,490 A | 6/1996 | Hill | |
| 5,537,314 A | 7/1996 | Kanter | 705/14 |
| 5,539,189 A | 7/1996 | Wilson | |
| 5,544,040 A | 8/1996 | Gerbaulet | |
| 5,557,513 A | 9/1996 | Frey et al. | |
| 5,564,546 A | 10/1996 | Molbak et al. | |
| 5,572,653 A | 11/1996 | DeTemple et al. | |
| 5,576,951 A | 11/1996 | Lockwood | 395/227 |
| 5,581,064 A | 12/1996 | Riley et al. | |
| 5,583,763 A | 12/1996 | Atcheson et al. | 364/551.01 |
| 5,592,375 A | 1/1997 | Salmon et al. | |
| 5,592,376 A | 1/1997 | Hodroff | |
| 5,592,560 A | 1/1997 | Deaton et al. | 382/100 |
| 5,602,377 A | 2/1997 | Beller et al. | |
| 5,604,343 A | 2/1997 | Curry et al. | |
| 5,611,052 A | 3/1997 | Dykstra et al. | |
| 5,612,868 A | 3/1997 | Off et al. | |
| 5,615,269 A | 3/1997 | Micali | |
| 5,619,558 A | 4/1997 | Jheeta | |
| 5,620,079 A | 4/1997 | Molbak | |
| 5,620,182 A | 4/1997 | Rossides | 273/138.2 |
| 5,621,201 A | 4/1997 | Langhans et al. | |
| 5,621,640 A | 4/1997 | Burke | |
| 5,621,812 A | 4/1997 | Deaton et al. | |
| 5,630,103 A | 5/1997 | Smith et al. | |
| 5,632,010 A | 5/1997 | Briechle et al. | |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,655,007 A | 8/1997 | McAllister | |
| 5,664,115 A | 9/1997 | Fraser | |
| 5,665,953 A | 9/1997 | Mazzamuto et al. | |
| 5,687,322 A | 11/1997 | Deaton et al. | 395/214 |
| 5,694,546 A | 12/1997 | Reisman | |
| 5,710,887 A | 1/1998 | Chelliah et al. | 395/226 |
| 5,717,866 A | 2/1998 | Naftzger | 395/214 |
| 5,742,886 A | 4/1998 | Snelling et al. | |
| 5,759,101 A | 6/1998 | Von Kohorn | |
| 5,772,510 A | 6/1998 | Roberts | 463/17 |
| 5,774,868 A | 6/1998 | Cragun et al. | 705/10 |
| 5,794,210 A | 8/1998 | Goldhaber et al. | |
| 5,806,045 A | 9/1998 | Biorge et al. | 705/14 |
| 5,822,735 A | 10/1998 | DeLapa et al. | 705/14 |
| 5,832,457 A | 11/1998 | O'Brien et al. | |
| 5,845,259 A | 12/1998 | West et al. | |
| 5,845,263 A * | 12/1998 | Camaisa et al. | 705/27 |
| 5,845,276 A | 12/1998 | Emerson et al. | 707/2 |
| 5,857,175 A | 1/1999 | Day et al. | |
| 5,869,826 A | 2/1999 | Eleftheriou | 235/380 |
| 5,880,449 A | 3/1999 | Teicher et al. | 235/383 |
| 5,884,272 A | 3/1999 | Walker et al. | 705/1 |
| 5,890,718 A | 4/1999 | Byon | |
| 5,918,209 A * | 6/1999 | Campbell et al. | 705/5 |

| | | | | |
|---|---|---|---|---|
| 5,923,016 A | 7/1999 | Fredregill et al. ............ 235/380 |
| 5,924,077 A | 7/1999 | Beach et al. .................. 705/10 |
| 5,926,796 A | 7/1999 | Walker et al. |
| 5,930,771 A * | 7/1999 | Stapp .......................... 705/28 |
| 5,946,665 A | 8/1999 | Suzuki et al. |
| 5,966,695 A | 10/1999 | Melchione et al. ............ 705/10 |
| 5,974,399 A | 10/1999 | Giuliani et al. ............... 705/14 |
| 5,999,914 A | 12/1999 | Blinn et al. ................... 705/26 |
| 6,014,634 A | 1/2000 | Scroggie et al. |
| 6,014,641 A | 1/2000 | Loeb et al. |
| 6,021,390 A | 2/2000 | Satoh et al. |
| 6,024,288 A | 2/2000 | Gottlich et al. |
| 6,029,139 A | 2/2000 | Cunningham et al. ......... 705/10 |
| 6,029,153 A | 2/2000 | Bauchner et al. .............. 705/42 |
| 6,039,244 A | 3/2000 | Finsterwald ................ 235/375 |
| 6,055,513 A | 4/2000 | Katz et al. .................... 705/26 |
| 6,061,660 A | 5/2000 | Eggleston et al. ............. 705/14 |
| 6,064,987 A | 5/2000 | Walker et al. |
| 6,070,147 A | 5/2000 | Harms et al. .................. 705/14 |
| 6,080,062 A | 6/2000 | Olson .......................... 463/42 |
| 6,085,164 A | 7/2000 | Smith et al. .................... 705/5 |
| 6,088,682 A | 7/2000 | Burke .......................... 705/17 |
| 6,112,191 A | 8/2000 | Burke .......................... 705/41 |
| 6,119,099 A | 9/2000 | Walker et al. .................. 705/16 |
| 6,131,399 A * | 10/2000 | Hall ............................. 62/127 |
| 6,138,105 A | 10/2000 | Walker et al. |
| 6,164,533 A | 12/2000 | Barton ......................... 705/35 |
| 6,223,163 B1 | 4/2001 | Van Luchene |
| 6,229,879 B1 | 5/2001 | Walker et al. |
| 6,253,188 B1 | 6/2001 | Witek et al. ................... 705/14 |
| 6,267,670 B1 | 7/2001 | Walker et al. ................. 463/17 |
| 6,292,786 B1 | 9/2001 | Deaton et al. |
| 6,298,329 B1 | 10/2001 | Walker et al. |
| 6,298,331 B1 | 10/2001 | Walker et al. |
| 6,307,958 B1 | 10/2001 | Deaton et al. |
| 6,321,210 B1 | 11/2001 | O'Brien et al. |
| 6,397,193 B1 | 5/2002 | Walker et al. |
| 6,463,585 B1 | 10/2002 | Hendricks et al. ............. 725/35 |
| 6,484,149 B1 | 11/2002 | Jammes et al. ................ 705/26 |
| 6,484,158 B1 | 11/2002 | Johnson et al. ................ 707/2 |
| 6,515,680 B1 | 2/2003 | Hendricks et al. ........... 345/716 |
| 6,582,304 B2 | 6/2003 | Walker et al. ................. 463/17 |
| 6,598,024 B1 | 7/2003 | Walker et al. ................. 705/16 |
| 2003/0037041 A1 | 2/2003 | Hertz ............................ 707/1 |
| 2003/0120579 A1 | 6/2003 | Carter, III .................... 705/36 |
| 2003/0130904 A1 | 7/2003 | Katz et al. .................... 705/26 |

FOREIGN PATENT DOCUMENTS

| | | |
|---|---|---|
| EP | 0 085 546 A2 | 8/1983 |
| EP | 0 109 189 A1 | 10/1983 |
| EP | 512 413 A2 | 11/1992 |
| EP | 512413 | 11/1992 |
| EP | 0 780 788 A2 | 6/1997 |
| FR | 2 736 177 | 1/1997 |
| FR | 2 757 656 A 1 | 6/1998 |
| GB | 1 391 060 | 4/1975 |
| JP | 57086974 | 5/1982 |
| JP | 357086974 | 5/1982 |
| JP | 600251498 | 12/1985 |
| JP | 2171891 | 7/1990 |
| JP | 2197998 | 8/1990 |
| JP | 289000 | 11/1990 |
| JP | 2278399 | 11/1990 |
| JP | 040960900 | 2/1992 |
| JP | 4095198 | 3/1992 |
| JP | 4260914 | 9/1992 |
| JP | 04314189 | 11/1992 |
| JP | 5242363 | 9/1993 |
| JP | 07-231309 | 8/1995 |
| JP | 8147545 | 6/1996 |
| JP | 08147545 A * | 6/1996 |
| JP | 8329350 | 12/1996 |
| JP | 09300730 A | 11/1997 |
| JP | 10031792 | 2/1998 |
| JP | 11-505343 | 5/1999 |
| WO | WO 91/03789 | 3/1991 |
| WO | WO 96/34358 | 10/1996 |
| WO | WO 96/36926 | 11/1996 |
| WO | WO 97/28510 | 8/1997 |
| WO | WO 97/35441 A | 9/1997 |
| WO | WO 97/46961 | 12/1997 |
| WO | WO 97/50064 | 12/1997 |
| WO | WO 98/43149 | 10/1998 |
| WO | WO 99/11006 | 3/1999 |
| WO | WO 99/19809 | 4/1999 |
| WO | WO 99/46706 | 9/1999 |

OTHER PUBLICATIONS

"Cape Town", Reuters, Nov. 8, 1979, 1pg.
Greene, Jan, "Farm Bills Please Assns; National Grocers Association", Capital Cities Media, Inc., Dec. 23, 1985, vol. 35 at p. 6, ISSN: 0039-5803, 1pg.
"POS Spectrum: A Lottery Looks to POS for Growth", UMI, Inc.; Banking Information Source, POS News Jan. 1989 vol. 5, No. 7, p. 8, 1pg.
"Winn-Dixie/the Salvation Army Report Contributions for War Against Hunger", PR Newswire Association, Inc., Jun. 10, 1993, 1pg.
Jones, Jeanne, "DataReaders Streamline Management: Scanner Technology Aids Retailers as Well as Plants, Wholesalers", The Houston Post, Jun. 26, 1994, 4pp.
Knippenberg, Jim, "Psst! Will Local Radio Empires Strike Back?", Copyright 1995, The Cincinnati Enquirer, Jul. 23, 1995, 1 pg.
Hadley, Kimberly, "Pastors Praying Anti-Arson Effort Will Burn Bias", Copyright 1996, Nashville Banner, 1 pg.
"Products and Services: Checkout Direct", Catalina Marketing Corporation, (http://catalinamktg.com/prodcdir.htm), download date: May 29, 1997, 12pp.
Riordan, Theresa, "Patents: A Novel Approach to Making a Better Spermicide Harks Back to Some Old-Fashioned Methods (subtitle: ", The New York Times, Jun. 9, 1997, Section D at p. 2, 3pp.
"Save the Mark", The Financial Times Limited, Feb. 1, 1983, 1pg.
Cook, Louise, "ConsumerWatch: Clip, Snip, Save", The Associated Press, Mar. 12, 1984, Business News Section, 2pp.
Kuttner, Robert, "Computers May Turn the World Into One Big Commodities Pit", Business Week, Sep. 11, 1989, Economic Viewpoint Section at p. 17, 2pp.
Schrage, Michael, "An Experiment in Economic Theory: Labs Testing Real Markets", The Record, Nov. 26,1989, Sunday, All Editions, Business Section at p. B1, 3pp.
Schwall, Benjamin, "Let's Play the Cash Register Receipts Lottery", New York Times Company, Dec. 25, 1990, Section 1, p. 30, col. 4, Editorial Desk, 1pg.
Del Rosso, Laura, "Marketel Says it Plans to Launch Air Fare 'Auction' in June", Travel Weekly, Apr. 29, 1991, vol. 50, No. 34 at p. 1, 4pp.
Author Unknown, "Philips Offers Customers Financing Through Citicorp; Philips Medical Systems North America, Citicorp North America, Inc.", Health Industry Today, Jun. 1991, vol. 54, No. 6; ISSN: 0745-4678 at p. 4, 1pg.
Pelline, Jeff, "Travelers Bidding on Airline Tickets, SF Firm Offers Chance for Cut-rate Fares", The San Francisco Chronicle, Aug. 19, 1991, Monday Final Edition at p. A4, 3pp.
Del Rosso, Laura, "Ticket-bidding Firm Closes Its Doors; Marketel International; Brief Article", Travel Weekly, Mar. 12, 1992, vol. 51; No. 21; ISSN: 0041-2082 at p. 1, 2pp.
Information Access Company, A Thompson Corporation Company ASAP, "Coupons Get Serious; Supermarkets Use Barcodes to Prevent Misredemptions", Chain Store Executive with Shopping Center Age, vol. 68 at p. 68, Copyright 1992, 2pp. Oct. 1992.
Fiorini, Phillip, "No Place for Penny? Smallest Coin Doesn't Make Cents to Some", USA Today, Jul. 1994, Final Edition at p. 1A, 3pp.
Smith, Alison, "Survey of UK Consumer Credit and Asset Finance", Financial Times, Nov. 3, 1994 at p. V1, 3pp.

Andreoli, Tom; Bordon, Jeff; Healy, Beth; Strahler, Steven R., and Veverka, Mark, "Cash Machines Offer A Whole Lotto Money for Withdrawal; An Unfortunate Juxtaposition; Block That Metaphor!, Something Street Talk; Fishy In Springfield; State Street Sears?; Champion as Underdog; A 'Whole Language' Graduate", Crain's Chicago Business, Jun. 19, 1995, News Section at p. 8, 2pp.

"Spain: BBV Launches New Card", Cards International, Jun. 22, 1995 at p. 5, 1pg.

Brochure: "CYBER BID", Net Fun, Ltd., Copyright 1996 and 1995, 6pp.

Gapper, John, "NatWest Reports Rise in Bad Debt", Financial Times, Jul. 31, 1996, London Edition 3, News: UK Section at p. 9, 1 pg.

Author Unknown, "Lynx Technology: Lynx to Provide Business Leasing Programme Through Schroder Leasing", M2 Presswire, Aug. 9, 1996, 2pp.

Taylor, Paul, "Towards a Dream Market", Financial Times (London) Sep. 4, 1996 at p. 3, 2pp.

Bonnici, Joseph; Campbell, David P.; Fredenberger, William B.; and Hunnicutt, Kathryn, H., "Consumer Issues in Coupon Usage: An Exploratory Analysis", Journal of Applied Business Research, Winter 1996/1997, 11pp.

Rehayem, Gilbert, "Opinion: X-Press Betting", LaFleur's Lottery World, 1pg.

Singletary, Michelle, "Electronic World, Unchecked Problem? U.S. Move to Paperless Payment Raises Worries About Those Who Don't Use Banks", The Washington Post, Mar. 4, 1997, Final Edition Financial Section at p. C01, 2pp.

Avco Financial Services, "National Home Furnishing Association", (http://www.homefurnish.com/NHFA/avco.htm), download date: May 23, 1997, 2pp.

Nairn, Geoff, "The Key To Your Identity: Falling Costs Will Allow Fingerprint Verification to be Widely Used, Reports Geoff Nairn", Financial Times (London), Jul. 15, 1997, Technology Section at p. 12, 3pp.

The United Computer Exchange, "How It All Works", The United Computer Exchange Corporation, (http://www.uce.comhowitiworks.htm), download date: Jul. 23, 1997, 5pp.

"Classifieds2000: The Internet Classifieds", Classified2000, (http://www.classifieds2000.com/cgi-cls/Display.exe?C2K+aboutus), download date: Aug. 6, 1997, 3pp.

"General Trading Floor Information and Terms Provided by Tradingfloor.com", (http://tradingfloor.com/info.htm), download date: Aug. 14, 1997, 11pp.

"NASDAQ: What is Nasdq?" Information Sheet, (http://home.axford.com/corfin/corfl1.htm), download date: Aug. 15, 1997, 3pp.

SIREN Technologies, Inc., "Introducing the Digital MenuBoard", (www.sirentech.com), 4pp.

Olivetti, "For the Crew & The Customer, The Best Drive-Thru & Grill Service", Winter 1998, 2pp.

"Bigger Plans", Card Fax, Oct. 1996, Section: vol. 96, No. 178, p. 2, 1pg.

Symons, Allene, "Lucky, Say-On Debut Rewards Cards", Drug Store News, vol. 19, Issue 4 Feb. 17, 1997, p. 3, 2pp.

Quittner, Jeremy, "Ohio's Provident Brings Its Discounts Card to Fla.", The American Banter, vol. 162, Issue 28, Feb. 11, 1997, Section: Credit/Debit/ATMs, p. 11, 2pp.

McKeveny, Alexander, "Giving Them A Good Reason", Bank Marketing, Mar. 1997, Mar. 1997, Section: vol. 29, No. 3, pp. 37-40, ISSN: 0888-3149, CODEN:ERKCDK, 5pp.

Brochure: "Reaching Out in New Directions", First Data Corporation, Merchant Services, undated, 32pp.

"Major Appliances: Tappan Unveils Microwave Oven Featuring Preprogrammed Controls", HFD, Sep. 10, 1984, p. 103, 1pg.

Silverman, Gene, "Planning and Using Infomercial Campaigns Effectively", Direct Marketing, Sep. 1995, vol. 58, No. 5, p. 32, 4pp.

McKinney, Jeff, "Merchant Program Could Pay Off for Provident", The Cincinnati Enquirer, Mar. 24, 1996, Section: Financial, p. E02, 2pp.

Raab, David M., "Package Aids Catalog Management", DM News, Apr. 22, 1996, Section: Software Review, p. 14, 2pp.

Fickenscher, Lisa, "Amex to Start Free Rewards Program with Discounts on Merchandise", The American Banker, Oct. 18, 1996, Section: Credit/Debit/ATMs, p. 10, 2pp.

Fitzgerald, Kate, "Amex Program Moves Loyalty to Next Level: Custom Extras Find A Medium Customers Can't Ignore: Billing Statements", Advertising Age, Nov. 4, 1996, Section: News, p. 2, 2pp.

Fickenscher, Lisa, "Merchant: American Express Seeks to Mine Its Data on Cardholder Spending Patterns", The American Banker, Mar. 24, 1997, Section: Credit/Debit/ATMs, p. 20, 2pp.

"Dispensing the Future", Electronic Payments International, May 1997, Section: Feature, p. 12, 5pp.

"Industry Briefs", Card News, Jun. 9, 1997, Section: vol. 12, No. 11, 2pp.

Hoeschen, Brad, "Brookfield Square Hopes Mall Card Strikes a Chord", Business Journal-Milwaukee, Sep. 12, 1997, Section: vol. 14, No. 50, p. 19, 2pp.

Website: "NCR 7452 Workstation — Beyond Traditional POS", (http:www.ncr.com/product/retail/products/catalog/7452.shtm), download date: Sep. 23, 1997, 3pp.

"NCR 7453 PC-Based Point-of-Sale Solutions", 1998 NCR Corporation, 2pp.

Examiner's Myhre Affidavit for U.S. Appl. No. 09/045,518, dated Feb. 22, 2001, 2pp.

Herman, Ken, "Auchan Cashes in on Lottery", Houston Post, Jul. 1, 1992, Section A, p. 15, col. 5, 2pp.

Kelsey, John and Schneier, Bruce, "Conditional Purchase Orders", Fourth AMC Conference on Computer Communication Security, AMC Press, Apr. 1997, 8pp.

Prochaska-Cue, Kathy, "Acquiring Credit", (http://ianr.www.unl.edu/IANR/PUBS/NEBFACTS/NF91.2.htm), download date: Sep. 3, 1997, 4pp.

Website: "Welcome to OnSale", (http://onsale.com), download date: Sep. 8, 1997, 15pp.

Website: "IAO — Onsale — GSCI — Zauction — Cyberswap — Auction World", (http://www.iao.auction.com/about.htm), download date: Sep. 8, 1997, 10pp.

Kirk, Jim, "Digital Promotions Make a Quick Point — McDonald's Testing New Technology on Its Menus", Chicago Tribune, Dec. 26, 1997, 2pp.

"From From Our Family to Yours . . . 5 Weeks of Coupon Values for a Valuable Customer", Wakefern Food Corporation, 1998, 1pg.

Brochure: "It's in The Bag. Introducing the Universal Holding Cabinet from Welbilt", Frymaster Corporation, 1998, 4pp.

"Progressive Introduces Kitchen Display System (KDS) for Restaurants", PR Newswire, Jan. 23,1998, Section: Financial News, 2pp.

Blair, Adam, "JICC Coupon Guide Recommends Upgrades at Front End", Supermarket News, Feb. 9, 1998, Section: p. 23, ISSN: 0039-5803, 2pp.

Livingston, Kimball, "In-Store Systems, VideOcart Redux", Retail Tech Magazine, Mar. 1998, pp. 29-30, 2pp.

Website: "Advanced Mechanics Internet Specials", (http://metroplexweb.com/advcpn2.htm), download date: Mar. 12, 1998, 4pp.

Website: "U.P.C. Coupon Code Guidelines Manual", Uniform Code Council, Inc., (http://www.uc-council.org/d31-3.htm), download date: Mar. 12, 1998, 10pp.

"New Wave Marketing", Promotion Times — An SCA Quarterly Newsletter — First Quarter. Apr. 1998, 2pp.

Hamstra, Mark, "Segment Study: 'Made-for-You' Maneuvers Signal Shift in QSR Category", Nation's Restaurant News, Apr. 13, 1998, 6pp.

Fogarty, Rich, "POSitive Input: The McDonald's POS-3 System Newsletter from Olivetti Solutions/OLSY", McDonald's Spring/Summer Edition 1998, 8pp.

"Universal Holding Cabinet Rollout Program", H&K Dallas, Inc., Winter 1998, 6pp.

Cyr, Diane, "Distribution Woes; Declining Newsstand Circulation; Includes Related Article On Preventing Newsstand Fraud", Folio: The Magazine for Magazine Management, Jan. 1995, vol. 23, No. 19, p. 170, ISSN: 0046-4333, 5pp.

Love, Barbara, "Folio: Plus Circulation; Techniques for Managing Magazine Circulation", Folio: The Magazine for Magazine Management, Jan. 1995, vol. 23, No. 19, p. 159, ISSN: 0046-4333, 3pp.

Kelly, Keith J., "Hearst Opens a Cyberspace Newsstand", Advertising Age, Jan. 30, 1995, vol. 66, Issue 5, p. 14, ISSN: 0001-8899, 2pp.

Schnuer, Jenna, "Overnight Options Add to Distribution Mix; Distribution of "Inside Sports" Magazine", Folio: The Magazine for Magazine Management, Mar. 1, 1995, vol. 24, No. 4, p. 19, ISSN: 0046-4333, 2pp.

Kelly, Keith J., "Publishers Pine for Cyber-Profits", Time, Inc., Mar. 13, 1995, vol. 66, Issue 11, pp. S-22, ISSN: 0001-8899, 2pp.

"Hearst Corporation Launches 'The Multimedia Newsstand", Link-Up, Mar./Apr. 1995, vol. 12, Issue 2, pp. 1 & 36, ISSN: 0739-988X, 3pp.

Wilson, Steve, "Out of Print - but Not Business; Magazines Move Away From Print in Favor of Electronic Publishing", Folio: The Magazine for Magazine Management, May 1, 1995, vol. 24, No. 8, p. 22, ISSN: 0046-4333, 2pp.

Hochwald, Lambeth, "Postal Blues: Circulators Cope With the Rate Crunch", Folio: The Magazine for Magazine Management, May 1, 1995, vol. 24, No. 8, p. 54, ISSN: 0046-4333, 3pp.

"Tretorn Offers Magazine Promo", AdWeek, May 1, 1995, Section: Newswire, 1pg.

"Lotto World", MediaWeek, May 8, 1995, vol. 5, No. 19 at p. 16, 1pg.

Graham, Anne, "Nonmember Subs - Or Not? Non-Member Subscriptions to Association Magazines; Includes Tips from Publishers", Folio: The Magazine for Magazine Management, Jun. 1, 1995, vol. 24, No. 10, p. 47, ISSN: 0046-4333, 4pp.

Miller, Paul, "Magazine Deal Lacks Catalog Appeal; Brief Article", Folio: The Magazine for Magazine Management, Jun. 15, 1995, vol. 24, No. 11, p. 30, ISSN: 0046-4333, 2pp.

Wilson, Steve, "Directory Assistance: A Buyer's Guide Can Give You a Big Boost in Revenue and Attract New Advertisers and Subscribers", Folio: The Magazine for Magazine Management, Oct. 1, 1995, vol. 24, No. 16, p. 40, ISSN: 0046-4333, 6pp.

Garratt, David, "What Premium on On-Cover Premiums?", Folio: The Magazine for Magazine Management, Oct. 1, 1995, vol. 24, No. 16, p. 53, ISSN: 0046-4333, 3pp.

"HFS Incorporates and Hatches Filipacchi Magazines; Announce Launch of Century 21 House & Home Magazine . . . ", Business Wire, Nov. 20, 1995, 2pp.

Hochwald, Lambeth, "Circulation Secrets: Nine Steps to a Successful Circulation Launch Strategy Includes List of Resources", Folio: The Magazine for Magazine Management, Feb. 1, 1996, vol. 25, No. 2, p. 53, ISSN: 0046-4333, 5pp.

Kerwin, Anne Marie, "Notably at the Newsstand: InStyle, Financial World Push for Greater Single-Copy Sales", Inside Media, Feb. 7, 1996, vol. 8, No. 3, p. 26, ISSN: 1046-5316, 2pp.

Adams, Mark, "Capell Reports Sales Drop at Newsstands", Mediaweek, Mar. 11, 1996, vol. 6, No. 11, p. 27, ISSN: 1055-176X, CODEN:MADEAP, 1pg.

Hodges, Jane, "WSJ Puts Squeeze on Web Subscriptions", Advertising Age, Apr. 29, 1996, vol. 67, Issue 18, p. 34, ISSN: 0001-8899, 2pp.

Schnuer, Jenna, "A World Without Magazines? Consumers Weigh In. Survey of Consumers Indicates That . . . ", Folio: The Magazine for Magazine Management, Jun. 1, 1996, vol. 25, No. 9, p. 16, ISSN: 0046-4333, 2pp.

Tedesco, Richard, "Time Launches 'Net Subscription Service'", Broadcasting & Cable, Nov. 11, 1996, vol. 126, Issue 47, p. 65, ISSN: 1068-6827, 2pp.

Case, Tony, "The Electronic Newsstand Branches Out", Folio: The Magazine for Magazine Management, Apr. 1, 1997, vol. 26, Issue 5, p. 13, ISSN: 0046-4333, 2pp.

Krol, Carol, "Magazine Site to Focus on Commerce", Advertising Age, Aug. 18, 1997, vol. 68, Issue 33, p. 18, ISSN: 0001-8899, 2pp.

Reilly, Brian, "Upselling' Strategies Hit the Net", Advertising Age's Business Marketing, Chicago, Dec. 1996, 1pg.

Forman, Preston P., "Vendors Practice What They Preach", Computer Reseller News, Manhasset, Mar. 2, 1998, 3pp.

Wingfield, Nick, "Priceline to Launch Online 'Yard Sales'", WSJ Interactive Edition (http://www.zdnet.com/filters/printerfriendly/0,6061,2413811-200.htm), 2pp.

PCT International Search Report for Application No. PCT/US98/05787, dated Apr. 27, 1999, 2pp.

Goodstein, Ronald C., "UPC Scanner Pricing Systems: Are They Accurate?", Journal of Marketing, Apr. 1994, vol. 58, No. 2, pp. 20-30, ISSN: 0022-2429, 17pp.

Stankevich, Debby Garbato, "Cook's Warehouse Sets Heavy-Gauge Nonstick", HFN, The Weekly Newspaper for the Home Furnishing Network, Aug. 14, 1995, Section: vol. 69, No. 33, p. 46, 2pp.

Rodwin, Marc A., "Consumer Protection and Managed Care: The Need for Organized Consumers", Health Affairs, Fall 1996, vol. 15, No.3, pp. 110-123, ISSN: 0278-2715, CODEN:fRBPBN, 11pp.

Kennedy, Doug, "Train Front Desk Staff in Sales; Hotel Industry", Hotel & Motel Management, Mar. 3, 1997, Section: No. 4, vol. 212,p. 15, ISSN: 0018-6082, 3pp.

PCT International Search Report for International Application No. PCT/US98/17287, dated Apr. 16, 1999.

Webster's II, New Riverside University Dictionary, 1994, Houghton-Mifflin Company, pp. 450.

Now Abandoned U.S. Appl. No. 09/083,689, entitled "Method and System for Selling Supplemental Products at a Point-Of-Sale", filed May 21, 1998 in the name of Andrew S. Van Luchene, 50pp.

Pending U.S. Appl. No. 09/107,971, entitled, "Method and Apparatus for Facilitating the Play of Fractional Lottery Tickets Utilizing Point-of-Sale Terminals", filed Jun. 30,1998, in the name of Andrew S. Van Luchene, 47pp.

Lang, Joan, "Round n' Round They Go", May 1, 1996, Restaurant Business, vol. 96, No. 7, pp. 132-134, 2pp.

PCT Written Opinion for Application No. PCT/US98/05787, dated Jul. 29, 1999, 11pp.

PCT International Search Report for Application No. PCT/US/05787, dated May 12, 1999, 2pp.

Wyatt, Craig, "Usage Models Just for Merchants", Credit Card Management, vol. 8, No. 6, pp. 3238, Sep. 1995, 4 pp.

PCT International Search Report For Application No. PCT/US01/09045, dated Oct. 10, 2001, 5pp.

Glickman Jeff, "10 Infomercial Facts You Need to Know"(Supplement: The Infomercial-Special Sourcebook Issue), Adweek Eastern Edition, vol. 34, No. 10, Mar. 8, 1993, p. S28, 6pp.

Office Action for U.S. Appl. No. 08/920,116, dated Oct. 1, 1999, 8pp.

Office Action for U.S. Appl. No. 08/920,116, dated Oct. 25, 1999, 6pp.

Office Action for U.S. Appl. No. 09/442,754, dated Aug. 2, 2000, 11pp.

Office Action for U.S. Appl. No. 09/442,754, dated Jan. 16, 2001, 11pp.

Office Action for U.S. Appl. No. 09/442,754, dated Aug. 1, 2001, 6pp.

Notice of Allowability for U.S. Appl. No. 09/442,754, dated Dec. 7, 2001, 4pp.

Office Action for U.S. Appl. No. 09/442,754, dated Jan. 7, 2003, 7pp.

Supplemental Allowance for U.S. Appl. No. 09/442,754, dated Mar. 4, 2003, 5pp.

Office Action for U.S. Appl. No. 10/625,089, dated Apr. 5, 2006, 7pp.

Office Action for U.S. Appl. No. 10/625,089, dated Sep. 10, 2007, 11pp.

Office Action for U.S. Appl. No. 09/045,386, dated Aug. 15, 2000, 12pp.

Office Action for U.S. Appl. No. 09/045,386, dated Mar. 14, 2001, 13pp.

Office Action for U.S. Appl. No. 09/045,386, dated Oct. 11, 2001, 5pp.

Office Action for U.S. Appl. No. 09/045,386, dated Jan. 25, 2002, 3pp.

Office Action for U.S. Appl. No. 09/045,386, dated Jul. 1, 2002 6pp.

Office Action for U.S. Appl. No. 09/045,386, dated Mar. 7, 2003 7pp.

Office Action for U.S. Appl. No. 09/045,386, dated Nov. 23,2004, 6pp.

Supplemental Notice of Allowability for U.S. Appl. No. 09/045,386, dated Mar. 20, 2006, 3pp.

Office Action for U.S. Appl. No.. 09/045,347, dated May 6, 1999, 6pp.

Office Action for U.S. Appl. No. 09/045,347, dated Jan. 11, 2000, 7pp.

Office Action for U.S. Appl. No. 09/045,347, dated Sep. 22, 2000, 8pp.

Office Action for U.S. Appl. No. 09/045,347, dated Apr. 10, 2001, 2pp.

Office Action (Restriction) for U.S. Appl. No. 09/933,588, dated Aug. 28,2006, 7pp.
Office Action for U.S. Appl. No. 09/933,588, dated Aug. 21, 2001, dated Jan. 3, 2007, 10pp.
Office Action for U.S. Appl. No. 09/083,689, dated Jun. 23, 1999, 11pp.
Office Action for U.S. Appl. No. 09/083,689, dated Jan. 31, 2000, 2pp.
Office Action for U.S. Appl. No. 09/083,689, dated Aug. 2, 2000, 19pp.
Office Action for U.S. Appl. No. 09/083,689, dated Jan. 16, 2001, 9pp.
Office Action for U.S. Appl. No. 09/083,689, dated Jul. 25, 2001, 9pp.
Office Action for U.S. Appl. No. 09/083,689, dated Mar. 18, 2002, 14pp.
Office Action for U.S. Appl. No. 09/045,518, dated Jun. 6, 2000, 9pp.
Interview Summary for U.S. Appl. No. 09/045,518, dated Nov. 14, 2000, 2pp.
Office Action for U.S. Appl. No. 09/045,518, dated Feb. 13, 2001, 14pp.
Office Action for U.S. Appl. No. 09/045,518, dated Jul. 2, 2001, 12pp.
Office Action for U.S. Appl. No. 09/045,518, dated Feb. 2, 2002, 2pp.
Office Action for U.S. Appl. No. 09/045,518, dated Apr. 5, 2002, 16pp.
Office Action for U.S. Appl. No. 09/045,518, dated Jun. 13, 2003, 19pp.
Decision on Appeal for U.S. Appl. No. 09/045,518, dated May 6, 2004, 63pp.
Interview Summary for U.S. Appl. No. 09/045,518, dated Jan. 31, 2005, 7pp.
Notice of Allowability for U.S. Appl. No. 09/045,518, dated Feb. 3, 2005, 6pp.
Office Action for U.S. Appl. No. 11/160,499, dated Mar. 15, 2006, 6pp.
Office Action for U.S. Appl. No. 11/160,499, dated Nov. 30, 2006, 3pp.
Office Action for U.S. Appl. No. 09/076,409, dated Apr. 13, 1999, 5pp.
Office Action for U.S. Appl. No. 09/076,409, dated Jan. 5, 2000, 6pp.
Notice of Allowability for U.S. Appl. No. 09/076,409, dated Mar. 27, 2001, 6pp.
Office Action for U.S. Appl. No. 09/643,668, dated Dec. 23,2002, 12pp.
Notice of Allowability for U.S. Appl. No. 09/643,668, dated Aug. 9, 2004, 4pp.
Office Action for U.S. Appl. No. 11/099,287, dated Jul. 12, 2006, 7pp.
Office Action for U.S. Appl. No. 11/099,287, dated Apr. 6, 2007, 10pp.
Office Action for U.S. Appl. No. 09/045,084, dated Apr. 3, 2000, 10pp.
Notice of Allowability for U.S. Appl. No. 09/045,084, dated Nov. 6, 2000, 4pp.
Office Action for U.S. Appl. No. 09/777,297, dated Jul. 8, 2004, 5pp.
Office Action for U.S. Appl. No. 09/083,483, dated Feb. 22, 2000, 8pp.
Office Action for U.S. Appl. No. 09/083,483, dated Nov. 22, 2000, 7pp.
Interview Summary for U.S. Appl. No. 09/083,483, Jan. 29, 2001, 4pp.
Interview Summary for U.S. Appl. No. 09/083,483, Feb. 9, 2001, 1pg.
Notice of Allowability for U.S. Appl. No. 09/083,483, Feb. 12, 2001, 3pp.
Office Action for U.S. Appl. No. 09/858,458, dated Jan. 26, 2005, 21pp.
Office Action for U.S. Appl. No. 09/858,458, dated Jun. 29, 2005, 9pp.
Office Action for U.S. Appl. No. 09/858,458, dated Mar. 24, 2006, 10pp.
Interview Summary for U.S. Appl. No. 09/858,458, dated Aug. 9, 2006, 2pp.
Office Action for U.S. Appl. No. 09/603,677, dated Mar. 11, 2003, 8pp.
Office Action for U.S. Appl. No. 09/603,677, dated Dec. 12, 2003, 38pp.
Office Action for U.S. Appl. No. 09/603,677, dated Apr. 6, 2004, 2pp.
Office Action for U.S. Appl. No. 09/603,677, dated Aug. 11,2004, 30pp.
Office Action for U.S. Appl. No. 09/603,677, dated Dec. 14, 2004, 22pp.
Office Action for U.S. Appl. No. 09/603,677, dated Mar. 22, 2007, 22pp.
Office Action for U.S. Appl. No. 09/603,677, dated Aug. 29, 2007, 2pp.
Office Action for U.S. Appl. No. 09/045,036, dated Dec. 11, 2007, 9pp.
Office Action for U.S. Appl. No. 10/678,056, dated Oct. 30, 2007, 5pp.
Office Action for U.S. Appl. No. 11/160,499, dated Nov. 15, 2007, 9pp.
Office Action for U.S. Appl. No. 11/099,287, dated Jan. 10, 2008, 9pp.
Office Action for U.S. Appl. No. 09/933,588, dated Apr. 7, 2009, 9pp.
Office Action for U.S. Appl. No. 11/099,287, dated Jul. 6, 2009, 22 pp.
Office Action for U.S. Appl. No. 11/099,287 dated Oct. 28, 2008, 18 pp.
Office Action for U.S. Appl. No. 11/621,422, dated Jul. 20, 2009, 14 pp.
Notice of Allowance for U.S. Appl. No. 10/625,089, dated Oct. 6, 2008, 9 pp.
Notice of Allowance for U.S. Appl. No. 10/625,089 dated Apr. 2, 2008, 9 pp.
Office Action for U.S. Appl. No. 10/625,089 dated Sep. 10, 2007, 11 pp.
Office Action for U.S. Appl. No. 10/625,089 dated Oct. 24, 2005, 7 pp.
Supplemental Notice of Allowability for U.S. Appl. No. 10/457,101, dated Dec. 11, 2007, 4 pp.
Office Action for U.S. Appl. No. 10/457,101 dated May 25, 2007, 13 pp.
Office Action for U.S. Appl. No. 10/457,101 dated Oct. 20, 2006, 12 pp.
Notice of Allowance for U.S. Appl. No. 11/456,276 dated May 28, 2009, 9 pp.
Office Action for U.S. Appl. No. 11/456,276 dated Aug. 20, 2008, 7 pp.
Office Action for U.S. Appl. No. 11/456,276 dated Dec. 31, 2007, 10 pp.
Office Action for U.S. Appl. No. 11/456,271, dated May 29, 2009, 11 pp.
Office Action for U.S. Appl. No. 11/456,271 dated Aug. 19, 2008, 8 pp.
Office Action for U.S. Appl. No. 11/456,271 dated Dec. 31, 2007, 10 pp.
Notice of Allowance for U.S. Appl. No. 08/822,709, dated Jan. 16, 2001, 3 pp.
Office Action for U.S. Appl. No. 08/822,709 dated Feb. 17, 2000, 6 pp.
Notice of Allowance for U.S. Appl. No. 09/836,409, dated Jan. 13, 2003, 4 pp.
Office Action for U.S. Appl. No. 09/836,409 dated Nov. 20, 2002, 4 pp.
Notice of Allowance for U.S. Appl. No. 09/836,409 dated Sep. 25, 2002, 4 pp.
Notice of Allowance for U.S. Appl. No. 09/836,409 dated May 16, 2002, 4 pp.
Office Action for U.S. Appl. No. 09/836,409 dated Oct. 1, 2001, 6 pp.
Notice of Allowance for U.S. Appl. No. 10/424,362, dated Nov. 4, 2004, 7 pp.

Office Action for U.S. Appl. No. 10/424,362 dated Jun. 9, 2004, 6 pp.
Office Action for U.S. Appl. No. 10/424,362 dated Nov. 19, 2003, 10 pp.
Notice of Allowance for U.S. Appl. No.11/058,653, dated Jul. 22, 2008, 4 pp.
Notice of Allowance for U.S. Appl. No. 11/058,653 dated Mar. 4, 2008, 7 pp.
Office Action for U.S. Appl. No. 11/058,653 dated May 15, 2007, 5 pp.
Notice of Allowance for U.S. Appl. No. 11/058,653 dated Jul. 22, 2008, 7 pp.
Notice of Allowance for U.S. Appl. No. 11/425,211, dated Feb. 9, 2009, 8 pp.
Office Action for U.S. Appl. No. 11/425,211 dated Mar. 26, 2008, 5 pp.
Notice of Allowance for U.S. Appl. No. 11/425,228, dated Oct. 8, 2008, 6 pp.
Office Action for U.S. Appl. No. 11/425,228 dated May 12, 2008, 7 pp.
Office Action for U.S. Appl. No. 11/425,228 dated Jul. 25, 2007, 6 pp.
Office Action for U.S. Appl. No. 11/425,232, dated Mar. 18, 2008, 5 pp.
Notice of Acceptance for Canadian Application No. 2,284,662, dated Oct. 3, 2003, 1 pg.
Office Action for Canadian Application No. 2,284,662 mailed Jan. 29, 2003, 3 pp.
Office Action for European Application No. 98 013 082, mailed Jul. 24, 2006, 5 pp.
Translation of Office Action for Japanese Application No. 545921/98, mailed Feb. 18, 2003, 4 pp.
Translation of Office Action for Japanese Application No. 545921/98, mailed Jun. 13, 2006, 8 pp.
International Search Report for Application No. PCT/US98/17287, dated Apr. 16, 1999, 2 pp.
Written Opinion for Application No. PCT/US98/17287, dated Sep. 13, 1999, 5 pp.
International Search Report for PCT/US98/16985, mailed Apr. 12, 2002, 3 pp.
Office Action for Application No. PCT/US98/17274, dated Sep. 30, 2002, 2 pp.
Office Action for Application No. 2000-508047, dated Apr. 2, 2002, 8 pp.
Office Action for Application No. 2299341, dated Dec. 17, 2001, 2 pp.
Office Action for Application No. 2299341, dated Feb. 3, 2004, 7 pp.
International Search Report for Application No. PCT/US98/17274, dated Apr. 12, 1999, 4 pp.
Written Opinion for Application No. PCT/US98/17274, dated Feb. 23, 2000, 7 pp.
International Preliminary Examination Report for PCT/US98/17274, dated Jun. 22, 2000, 8 pp.
International Preliminary Examination Report for PCT/US01/09045 dated Sep. 18, 2002, 3 pp.
"Sharing the winnings", Boston Globe, Apr. 2, 1995, 1 pg.
Downing, Neil, "Money Line: IF 12 people share a winning ticket, they'll have to share a single check", Providence Journal - Bulletin, Oct. 17, 1995, 3 pp.
Notice of Allowance for Application No. 09/858,458, mailed Aug. 25, 2006, 9 pp.
Office Action for U.S. Appl. No. 09/858,458 mailed Mar. 24, 2006, 10 pp.
Office Action for U.S. Appl. No. 09/858,458 mailed Jun. 29, 2005, 9 pp.
Office Action for U.S. Appl. No. 09/858,458 mailed Jan. 26, 2005, 21 pp.
Office Action for U.S. Appl. No. 11/456,276 mailed Jan. 13, 2010, 13 pp.
Notice of Allowance for U.S. Appl. No. 11/934,958, mailed Dec. 1, 2007.
Notice of Allowance for U.S. Appl. No. 11/934,958 mailed Aug. 3, 2009, 5 pp.
Office Action for U.S. Appl. No. 11/934,958 mailed Sep. 24, 2008, 6 pp.

Office Action for U.S. Appl. No. 11/856,473, mailed Sep. 12, 2008, 5 pp.
The Economist, "Heads I Win, Tails You Lose, M. Rossides' Application of Fair Gambling to Grocery Check-Outs", Business; P. 74, Jun. 13, 1992, 2pp.
"Georgia Almanac", Georgia Almanac, Jan. 26, 1983, BC Cycle, Section: Regional News, 2pp.
Herman, Ken, "Lottery's Losers: Small Stores; Big Pots Bring Big Problems", Austin American-Statesman, Nov. 23, 1996, Section: News, 4pp.
"The Northwest German State Lottery — Your Invitation to Play", (http://www.germanstatelottery.com.invitation.html), download date: May 14, 1999, 2pp.
"Official Lottery Rules", (http://www.gloeckle.com/dedingungen/main.html), download date: May 14, 1999, 5pp.
Website: "What Actually is the SKL?", (http://www.gloeckle.com/das_spiel/rechts.html), download date: May 14, 1999, 3pp.
"Epson Partners With International Lottery & Totalizer Systems; Epson's New Acclaim Program Wins With the Gaming Market", Business Wire, Jun. 7, 1999, 2pp.
"The Change Game", Georgia State Lottery Ticket - Mega Millions Jackpot, Draw Date Aug. 8, 2002, 1pg.
"Georgia Lottery Corporation - Change Game", (http://www.Georgialottery.com/changegame.html), download date: Dec. 4, 2002, 3pp.
Website: "Michigan Lottery", (http://www.Michigan.gov/lottery/0,16077-110-812_21193_21321--00.html), download date: Dec. 4, 2002, 2pp.
Website: "The Change Game - Turning Loose Change into Lottery Dollars", (http://www.berschgaming.com/about_the_game.htm), download date: Dec. 4, 2002, 1 pg.
"Magazine Subscription Sales Center - Where Buying Subscriptions is Easy!", Customer Service Information, Interactive Magazine Sales, Inc., e-mail: aim@panix.com, 2pp.
Howland, Jennifer, "National Distribution: Scanning the Future", Folio: The Magazine for Magazine Management, Feb. 1985, Section: vol. 14, p. 69, ISSN: 0046-4333, 11pp.
Wood, Wally, "Circulation Marketing: Let Your Magazine Do the Selling", Folio: The Magazine for Magazine Management, Jun. 1985, vol. 14, p. 78, ISSN: 0046-4333, 10pp.
Reese, Diane, "Revitalizing Single-Copy Sales", Folio: The Magazine for Magazine Management, Feb. 1986, vol. 15, p. 84, ISSN: 0046-4333, 14 pp.
Joyce, Walter, "Muscular Merchandising: column", Folio: The Magazine for Magazine Management, Jun. 1986, vol. 15, p. 124, ISSN: 0046-4333, 5pp.
"Phoenix Papers to Sell Merchandise to Build Awareness", Editor & Publisher, Sep. 17, 1988, vol. 121, Issue 38, p. 23, ISSN: 0013-094X, 2pp.
Donaton, Scott, "Gift Subscriptions Find Retail Niche", Advertising Age, Jul. 16, 1990, Section: News at p. 37, 2pp.
Guy, Pat, "A Gift Off the Rack: Mag Subscription", USA Today, Dec. 19, 1990, Section: Money at p. 2B, 2pp.
Jaben, Jan, "Magazine Gift-giving Made Simple at Retail Outlets; Time Inc., Hearst, Meredith Test Subscriber Systems' Method of Selling Gift Subscriptions; News" Feb. 15, 1991, vol. 3, No. 2, p. 15, ISSN: 1043-8688, 3pp.
Horton, Liz, "Holiday Gift Subs Up, Some Due to Novel Promotions", Folio: The Magazine for Magazine Management, Feb. 1, 1992, Section: vol. 21, No. 2, p. 39, ISSN: 0046-4333, 1 pg.
Carlson, Lynn, "Decreasing Your Direct-Mail Costs", Folio: The Magazine for Magazine Management, Sep. 1, 1992, vol. 21, Issue 9, pp. 81-82, ISSN: 0046-4333, 3pp.
Manly, Lorne, "A Newsstand for the Electronic Age", Folio: The Magazine for Magazine Management, Sep. 15, 1993, vol. 22, No. 16, p. 17, ISSN: 0046-4333, 3pp.

Hochwald, Lambeth, "Sub Sources that Break With Tradition", Folio: The Magazine for Magazine Management, May 1, 1994, vol. 23, Issue 8, pp. 46-48, ISSN: 0046-4333, 4 pp.

Love, Barbara, "Selling Subscriptions at Newsstands", Folio: The Magazine for Magazine Management, Jun. 1, 1994, vol. 23, Issue 10, p. 10, ISSN: 0046-4333, 2 pp.

"The Super Subs", Precision Marketing, Oct. 24, 1994, No. 0, vol. 0, p. 23, ISSN: 0957-4913, 5pp.

Notice of Allowance for U.S. Appl. No. 11/934,958, mailed Dec. 10, 2009, 6 pp.

* cited by examiner

92

| FOOD PRODUCT IDENTIFIER 118 | FOOD PRODUCT DESCRIPTION 120 | RETAIL PRICE 122 |
|---|---|---|
| 123 | HAMBURGER | $0.69 |
| 124 | CHEESEBURGER | $0.79 |
| 125 | CHICKEN SANDWICH | $1.59 |
| 126 | APPLE PIE | $0.49 |

| FOOD PRODUCT IDENTIFIER 138 | FOOD PRODUCT DESCRIPTION 140 | QUANTITY 142 | MINIMUM PRICE 144 |
|---|---|---|---|
| 123 | HAMBURGER | 2 | $0.40 |
| 126 | APPLE PIE | 1 | $0.00 |
| 125 | CHICKEN SANDWICH | 1 | $0.32 |
| 124 | CHEESEBURGER | 1 | $0.00 |

FIG. 6

| FOOD PRODUCT NO. 123 ("HAMBURGER") 282 | |
|---|---|
| AGE 288 | PRICE 290 |
| 0 - 15 MINS. | RETAIL PRICE |
| > 15 MINS. | SELL FOR CHANGE DUE |

| AGE 308 | MINIMUM PRICE 310 |
|---|---|
| 0 - 15 MINS. | RETAIL PRICE |
| 16 - 17 MINS. | 50% RETAIL PRICE |
| > 17 MINS. | 10% RETAIL PRICE |

302 → (row 1)
304 → (row 2)
306 → (row 3)

| FOOD PRODUCT NO. 123 ("HAMBURGER") 322 |||
|---|---|---|
| AGE 330 | MINIMUM PRICE 332 | MAXIMUM PRICE 334 |
| 0 - 15 MINS. | RETAIL PRICE ($0.69) | RETAIL PRICE ($0.69) |
| 16 - 18 MINS. | $0.40 | RETAIL PRICE ($0.69) |
| > 18 MINS. | $0.00 | RETAIL PRICE ($0.69) |

324 → (row 1)
326 → (row 2)
328 → (row 3)

FIG. 13

METHOD AND APPARATUS FOR SELLING AN AGING FOOD PRODUCT

The present application is a continuation of U.S. patent application Ser. No. 09/858,458, entitled "METHOD AND APPARATUS FOR SELLING AN AGING FOOD PRODUCT" filed May 16, 2001 and issued as U.S. Pat. No. 7,184,990 on Feb. 27, 2007, which is a continuation-in-part of U.S. patent application Ser. No. 09/083,483, entitled "METHOD AND APPARATUS FOR SELLING AN AGING FOOD PRODUCT" filed May 22, 1998 and issued as U.S. Pat. No. 6,298,331 on Oct. 2, 2001; which is a continuation-in-part of U.S. patent application Ser. No. 08/920,116, entitled "METHOD AND SYSTEM FOR PROCESSING SUPPLEMENTARY PRODUCT SALES AT A POINT-OF-SALE TERMINAL," filed Aug. 26, 1997 and issued as U.S. Pat. No. 6,119,099 on Sep. 12, 2000, which is a continuation-in-part of U.S. patent application Ser. No. 08/822,709, entitled "SYSTEM AND METHOD FOR PERFORMING LOTTERY TICKET TRANSACTIONS UTILIZING POINT-OF-SALE TERMINALS," filed Mar. 21, 1997 and issued as U.S. Pat. No. 6,267,670 on Jul. 31, 2001. Each of the above-referenced applications is incorporated by reference herein in its entirety.

CROSS REFERENCE TO RELATED APPLICATIONS

The present invention is related to the following United States Patent Applications:

U.S. patent application Ser. No. 08/923,683 entitled "CONDITIONAL PURCHASE OFFER (CPO) MANAGEMENT SYSTEM FOR PACKAGES," filed on Sep. 4, 1997 and issued as U.S. Pat. No. 6,553,346 on Apr. 22, 2003 in the name of Jay S. Walker et al.; and U.S. patent application Ser. No. 09/012,163 entitled "METHOD AND APPARATUS FOR AUTOMATICALLY VENDING A COMBINATION OF PRODUCTS," filed on Jan. 22, 1998 and issued as U.S. Pat. No. 6,397,193 on May 28, 2002 in the name of Jay S. Walker et al., each assigned to the assignee of the present invention and incorporated by reference herein.

FIELD OF THE INVENTION

The present invention relates to methods and apparatus for selling aging food products.

BACKGROUND OF THE INVENTION

Quick service restaurants are restaurants that specialize in rapidly selling food that is typically ordered only a few minutes before it is tendered to the customer. Many quick service restaurants will sell food products for some time after those food products have been prepared. For example, hamburgers may be available for sale up to twenty minutes after being cooked. Food products that are excessively aged become "perished" (e.g. stale or soggy). Selling such perished food products would hurt the reputation of the restaurant. Furthermore, aged food products can pose a significant health risk to consumers, which in turn would impose liability on the restaurant. Accordingly, if the food product is not sold within a certain time period after being prepared it is typically thrown away. This waste is considered a cost of doing business and factored into the restaurant's expenses.

Some modern quick service restaurants have systems for reducing the waste associated with excessively aged food products. For example, some restaurants include a demand forecasting apparatus that attempts to predict future demand for various food products. Such predictions are used to determine types and quantities of food products to be prepared. Perfect predictions would allow a restaurant to eliminate significant amounts of waste, since only those food products about to be ordered would be prepared. Unfortunately, applicants are unaware of any demand forecasting apparatus that is capable of making predictions with anywhere near perfect accuracy. Accordingly, demand forecasting apparatus do not eliminate waste in restaurants.

Restaurants may use various processes and apparatus to keep food products fresher for longer periods of time after cooking. For example, the Welbilt UHC4TP Universal Holding Cabinet retains cooked food components, such as hamburger patties and chicken patties, and keeps those food components fresh until they are assembled into food products, such as hamburgers and chicken sandwiches. For example, hamburger patties may be cooked on a grill and then placed in the Universal Holding Cabinet, where they remain for up to a predetermined length of time. A timer measures the length of time that the patty is in the Universal Holding Cabinet. Food components are typically assembled only when there is a need for a certain food product. Such a need may arise from an actual order for the food product or from a predicted (anticipated) order generated by a demand forecasting apparatus. For example, if hamburgers are or will be needed, the hamburger patties are removed from the Universal Holding Cabinet and assembled into hamburgers.

If a food component is not removed from the Universal Holding Cabinet before the timer reaches the predetermined time, the patty is considered not sellable and is discarded. Similarly, once a food product has been assembled, there is a limited time period within which the food product may be sold. For example, an assembled hamburger may be discarded after twenty minutes. Assembled food products are maintained in a warming bin or similar warming apparatus while they await sale, as are other food products that are ready to sell yet require no assembly.

Thus, food products and food components are often discarded at considerable cost to the restaurant. The various methods and apparatus that restaurants may employ serve to somewhat reduce this significant waste. It would be advantageous to further reduce the costs associated with the inability to sell perished food products.

SUMMARY OF THE INVENTION

It is an object of the present invention to reduce the costs associated with the inability to sell all food products that are prepared in a restaurant.

In accordance with the present invention, an automated kitchen apparatus determines a time until expiration of a food product. In one embodiment, the kitchen apparatus determines the time until expiration by receiving a start signal indicating that a food product is available to sell. Such a start signal may be generated by a timer on a warming bin that is initiated when a food product is placed in the warming bin. By measuring the elapsed time since the start signal was received, the time until expiration is determined.

Based on the time until expiration, the automated kitchen apparatus sets the minimum price of that food product. Customers at a POS terminal may then purchase the aged food product for the minimum price, or in another embodiment for an amount that is greater than the minimum price. In one embodiment, an offer describing the food product and its minimum price is displayed on the POS terminal. In another embodiment, the customer is offered the food product for his change due, if that change due is not less than the minimum price.

BRIEF DESCRIPTION OF THE DRAWINGS

FIG. 5 is a schematic illustration of an inventory database of the store server of FIG. 4.

FIG. 6 is a schematic illustration of an aged inventory database of the store server of FIG. 4.

FIG. 11 is a schematic illustration of a record of an embodiment of a price adjustment database of FIG. 4.

FIG. 12 is a schematic illustration of an embodiment of a price adjustment database of FIG. 4.

FIG. 13 is a schematic illustration of a record of an embodiment of a price adjustment database of FIG. 4.

DETAILED DESCRIPTION OF THE PREFERRED EMBODIMENTS

The present invention allows a restaurant or similar entity to significantly reduce costs and thus increase profits by identifying and selling aged food products that would otherwise have been discarded. Food products are maintained in warming bins while they await being sold. If a food product in a warming bin cannot be used to satisfy an order (whether an actual or anticipated order), then a POS terminal or other device provides an offer to sell the food product for a reduced price. If the offer is accepted, the food product is sold and registered as no longer available for sale. Thus by automatically tracking aged food products, determining appropriate prices for those food products, and dynamically adjusting a database of available food products, a restaurant may further reduce the waste associated with aged food products.

Figure 1:
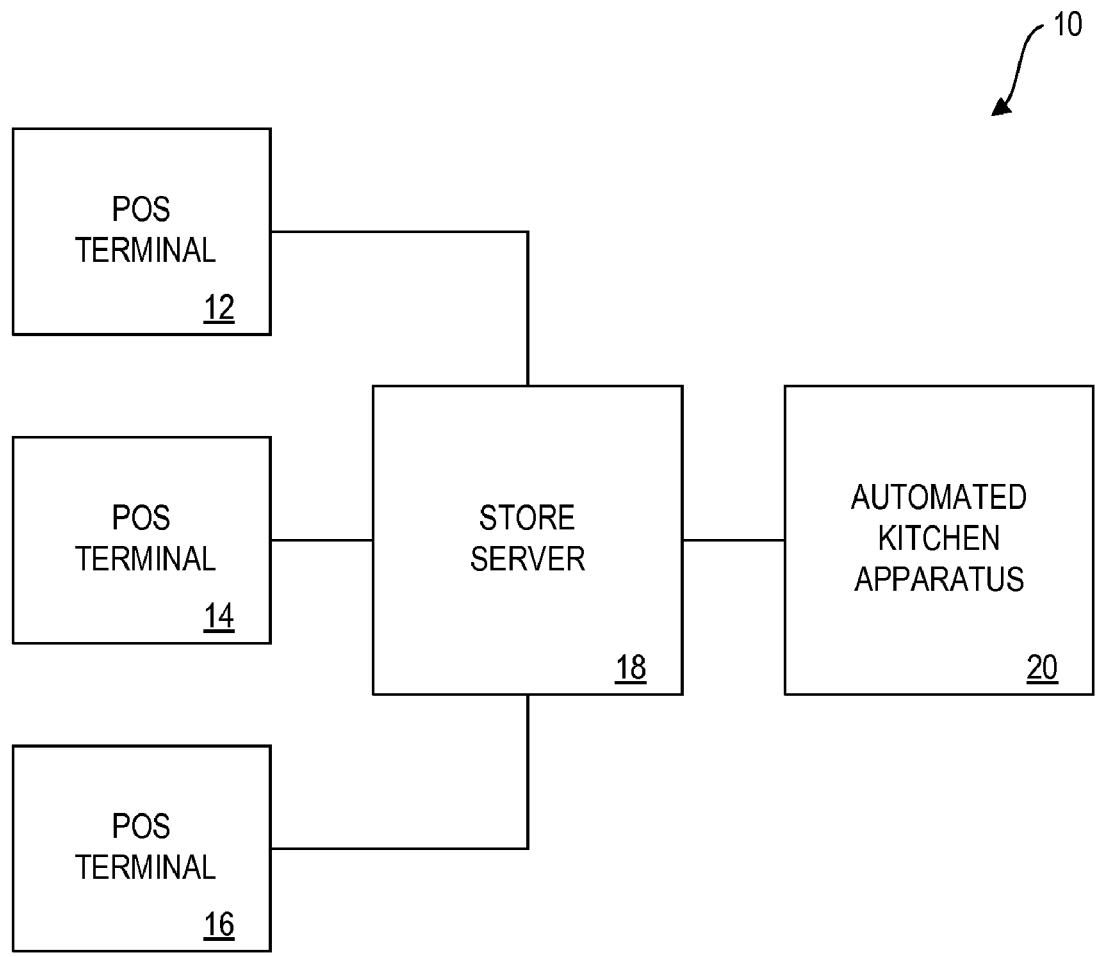
FIG. 1 is a schematic illustration of a restaurant apparatus provided in accordance with the present invention.

Referring to FIG. 1, a restaurant apparatus 10 includes point-of-sale ("POS") terminals 12, 14 and 16, each of which are in communication with a store server 18. The POS terminals 12, 14 and 16 may be, for example, the PAR Microsystems POS III or POS IV. The POS terminals 12, 14 and 16 perform such processes as calculating the total price of a purchase (goods or services) and calculating the amount of change due to a customer. The POS terminals 12, 14 and 16 may furthermore track purchases made and adjust databases of inventory accordingly. Any number of POS terminals may be included in the restaurant apparatus 10. Although three POS terminals are shown in FIG. 1, any number of POS terminals may be in communication with the store server 18 without departing from the spirit and scope of the present invention.

The store server 18 directs the operation of, stores data from and transmits data to the POS terminals 12, 14 and 16. The store server 18 may itself be a POS terminal, as described herein, or may be another computing device that can communicate with one or more POS terminals. Each of the POS terminals 12, 14 and 16 may be located in the same store, in different stores of a chain of stores, or in other locations. The store server 18 may perform many of the processes described below, especially those processes that are performed for more than one POS terminal. The store server 18 may furthermore store data, such as an inventory database, that is to be shared by the POS terminals 12, 14 and 16. Similarly, data described herein as stored on the store server 18 may be stored on the POS terminals 12, 14 and 16, as appropriate.

The store server 18 is also in communication with an automated kitchen apparatus 20. The automated kitchen apparatus 20, described in further detail below, includes components for preparing food products for sale to customers. The store server 18 receives from the automated kitchen apparatus 20 an indication of aged food products that should be sold. The store server 18 in turn communicates with the POS terminals 12, 14 and 16, where customers may be sold such aged food products.

Figure 2:
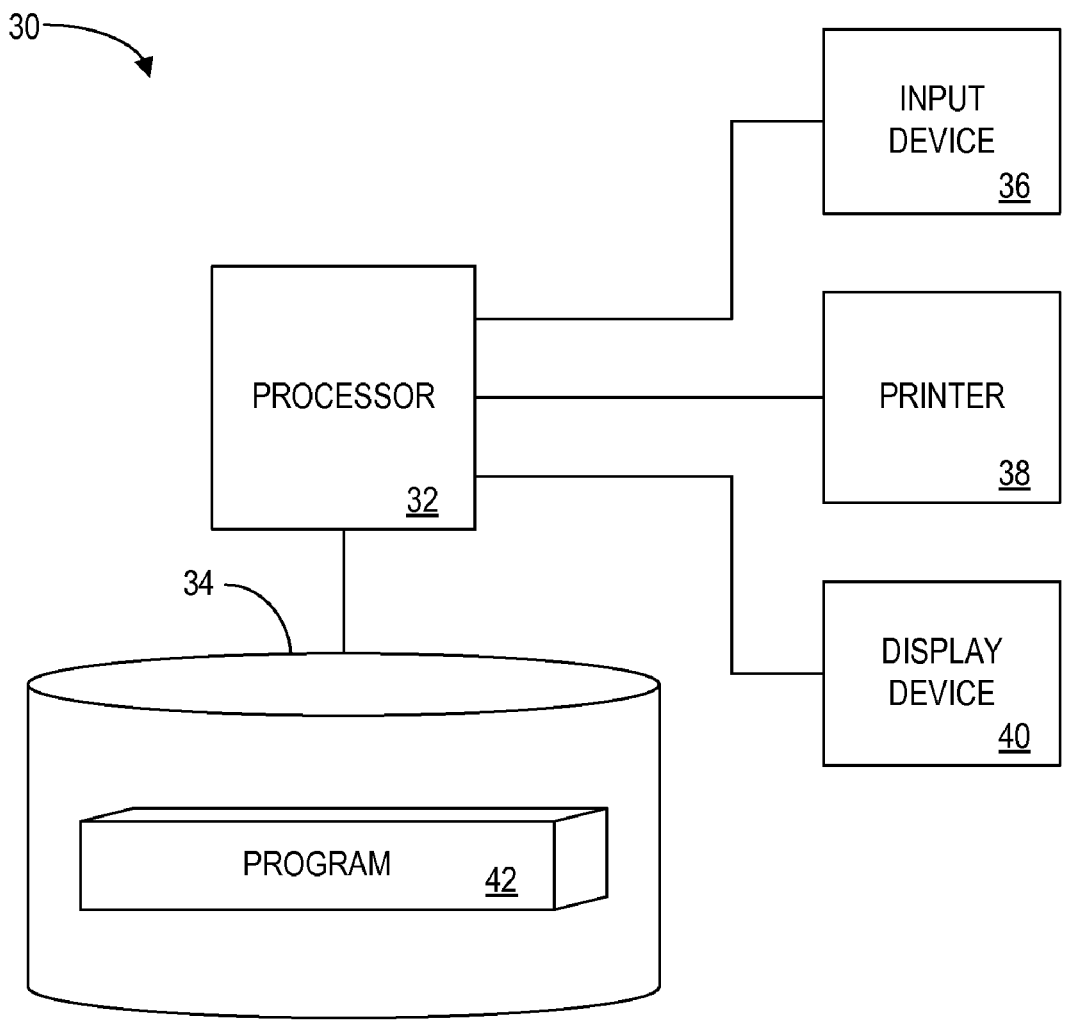
FIG. 2 is a schematic illustration of a POS terminal of the restaurant apparatus of FIG. 1.

FIG. 2 illustrates a POS terminal 30 that is descriptive of any or all of the POS terminals 12, 14 and 16 (FIG. 1). The POS terminal 30 comprises a processor 32, such as one or more conventional microprocessors. The processor 32 is in communication with a data storage device 34, such as an appropriate combination of magnetic, optical and/or semiconductor memory. The processor 32 and the storage device 34 may each be (i) located entirely within a single computer or other computing device; (ii) connected to each other by a remote communication medium, such as a serial port cable, telephone line or radio frequency transceiver; or (iii) a combination thereof. For example, the POS terminal 30 may comprise one or more computers that are connected to a remote server computer for maintaining databases.

An input device 36 preferably comprises a keypad for transmitting input signals, such as signals indicative of a purchase, to the processor 32. The input device 36 may also comprise an optical bar code scanner for reading bar codes and transmitting signals indicative of those bar codes to the processor 32. A printer 38 is for registering indicia on paper or other material, thereby printing waste receipts, sales receipts and coupons as controlled by the processor 32. A display device 40 is preferably a video monitor for displaying at least alphanumeric characters to the customer and/or cashier. Many types of input devices, printers and display devices are known to those skilled in the art, and need not be described in detail herein. The input device 36, printer 38 and display device 40 are each in communication with the processor 12.

The storage device 34 stores a program 42 for controlling the processor 32. The processor 32 performs instructions of the program 42, and thereby operates in accordance with the present invention, and particularly in accordance with the methods described in detail herein. The program 42 furthermore includes program elements that may be necessary, such as an operating system and "device drivers" for allowing the processor 32 to interface with computer peripheral devices, such as the input device 36, the printer 38 and the display device 40. Appropriate device drivers and other necessary program elements are known to those skilled in the art, and need not be described in detail herein.

Figure 3:
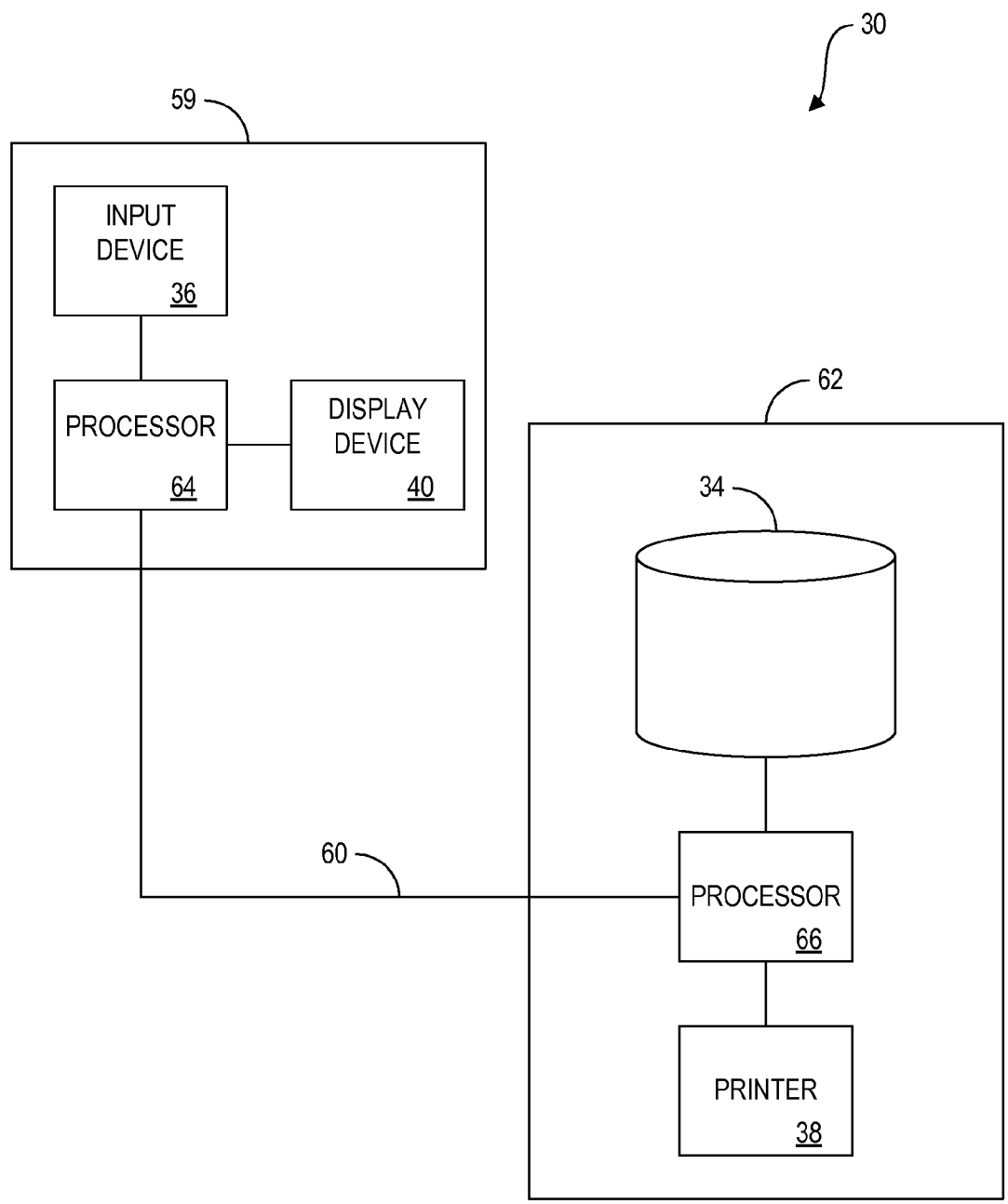
FIG. 3 is a schematic illustration of another embodiment of the POS terminal of FIG. 2.

FIG. 3 illustrates another embodiment of a POS terminal 30, in which a control device 59 is in communication via a communication medium 60 with a system 62 for providing an offer for an upsell. The control device 59 comprises a processor 64 in communication with the input device 36 and the display device 40. The system 62 for providing an offer comprises a processor 66 in communication with the storage device 34 and the printer 38. In this embodiment, the control device 59 may be a cash register, and the system 62 may be an electronic device for printing coupons in accordance with data received from the cash register. Other configurations of the POS terminal 30 will be understood by those skilled in the art.

Figure 4:
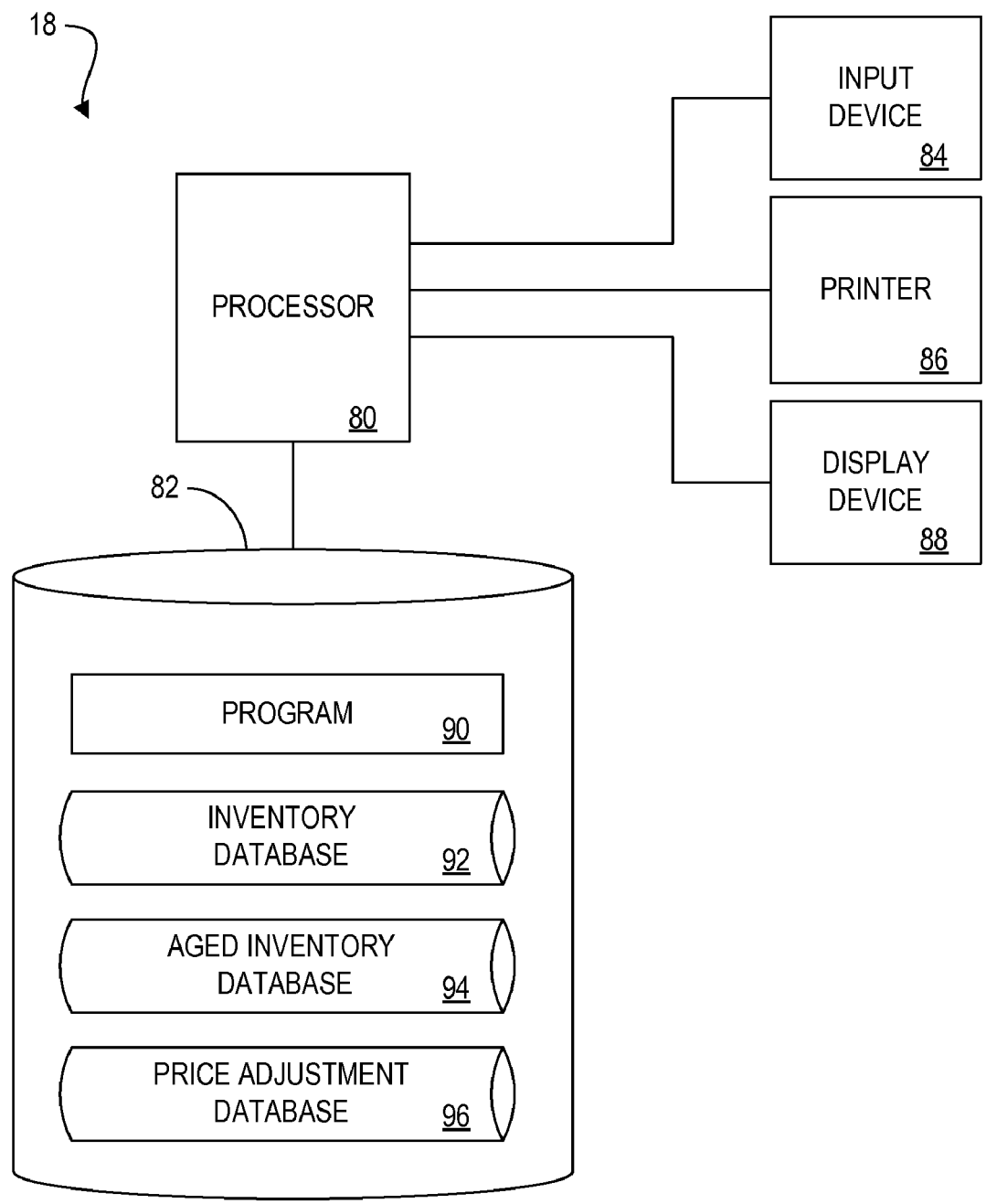
FIG. 4 is a schematic illustration of a store server of the restaurant apparatus of FIG. 1.

FIG. 4 illustrates the store server 18 (FIG. 1), which comprises a processor 80, such as one or more conventional microprocessors, such as the INTEL PENTIUM® microprocessor. The processor 80 is in communication with a data storage device 82, such as an appropriate combination of magnetic, optical and/or semiconductor memory, as is apparent to those skilled in the art. The processor 80 and the storage device 82 may each be (i) located entirely within a single computer or other computing device; (ii) connected to each other by a remote communication medium, such as a serial port cable, telephone line or radio frequency transceiver; or (iii) a combination thereof. For example, the store server 18 may comprise one or more conventional computers that are connected to a remote server computer for maintaining databases.

An input device 84 preferably comprises a keypad for transmitting input signals to the processor 80. A printer 86 is for registering indicia on paper or other material, thereby printing reports and other documents as controlled by the processor 80. A display device 88 is preferably a video monitor for displaying at least alphanumeric characters. Many types of input devices, printers and display devices are known to those skilled in the art, and need not be described in detail herein. The input device 84, printer 86 and display device 88 are each in communication with the processor 80.

The storage device 82 stores a program 90 for controlling the processor 80. The processor 80 performs instructions of the program 90, and thereby operates in accordance with the present invention, and particularly in accordance with the methods described in detail herein. The program 90 furthermore includes program elements that may be necessary, such as an operating system and "device drivers" for allowing the processor 80 to interface with computer peripheral devices, such as the input device 84, the printer 86 and the display device 88. Appropriate operating systems, device drivers and other necessary program elements are known to those skilled in the art, and need not be described in detail herein.

The storage device 82 also stores (i) inventory database 92; (ii) aged inventory database 94; and (iii) price adjustment database 96. The databases 92, 94 and 96 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, and those skilled in the art will understand that the number and content of the entries can be different from those illustrated herein.

Referring to FIG. 5, the inventory database 92 includes entries 110, 112, 114 and 116, each defining a food product. Each entry includes (i) a food product identifier 118 that uniquely identifies the food product; (ii) a description 120 of the food product; and (iii) a retail price 122 of the food product. Information stored in the inventory database 92 is available to the POS terminals 12, 14 and 16 (FIG. 1), so that any POS terminal may, for example, calculate a price of a purchase that includes one or more food products that are ordered. The information stored in the inventory database 92, particularly the selection of available food products and their retail prices, is typically established by a restaurant manager or other personnel.

Referring to FIG. 6, the aged inventory database 94 includes entries 130, 132, 134 and 136, each defining a food product that has aged excessively and thus is desirable to sell at a reduced price, rather than be discarded. Each entry includes (i) a food product identifier 138 that uniquely identifies the aged food product, and that corresponds to the food product identifier 118 (FIG. 5); (ii) a description 140 of the aged food product; (iii) a quantity 142 of the aged food product that is available to sell at a reduced price; and (iv) a minimum price 144 of the aged food product. As described below, an aged food product may be sold for an amount equal to the minimum price, or in another embodiment may be sold for an amount equal to or greater than the corresponding minimum price of the food product.

Information stored in the aged inventory database 94 is available to the POS terminals 12, 14 and 16 (FIG. 1), so that any POS terminal may provide an indication of aged food products that are currently available for sale. The information stored in the aged inventory database 94 is typically established by the automated kitchen apparatus 20, as described in detail below.

Figure 7:
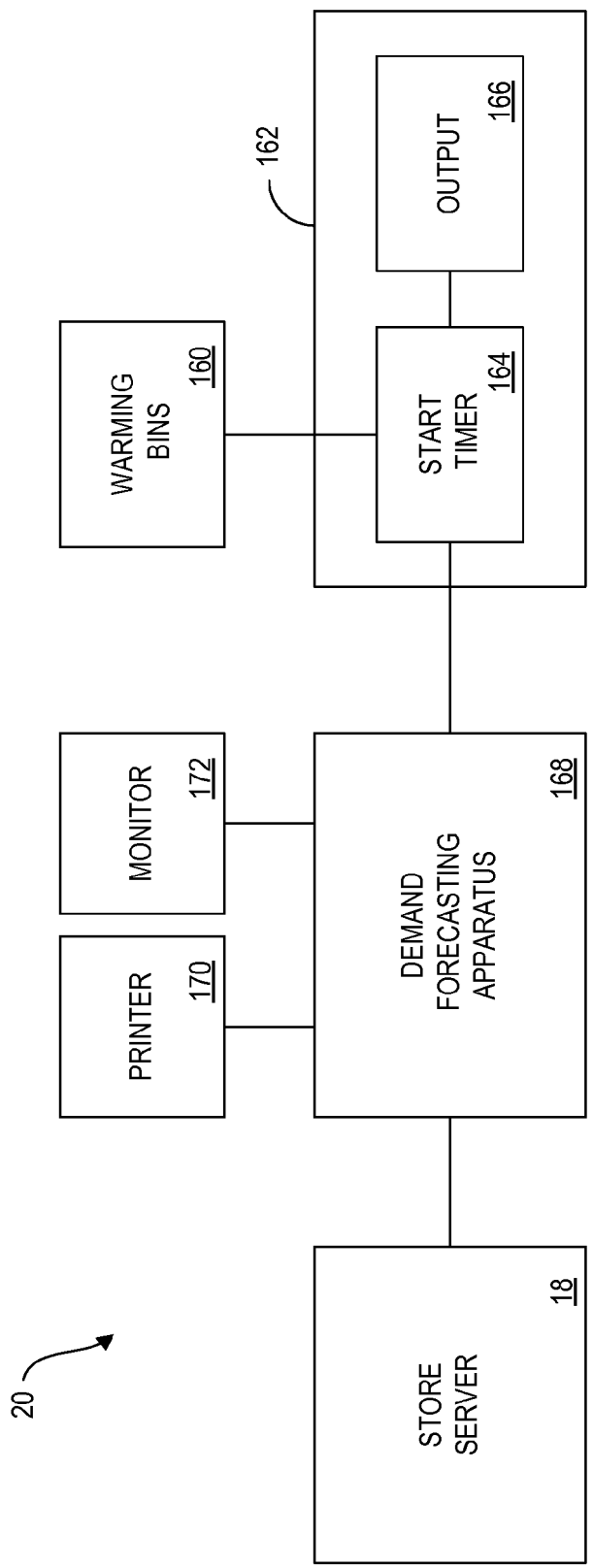
FIG. 7 is a schematic illustration of an automated kitchen apparatus of the restaurant apparatus of FIG. 1.

Referring to FIG. 7, the automated kitchen apparatus 20 includes warming bins 160 that hold cooked food products that are available for sale and keep those food products warm while they await being sold. Suitable apparatus for holding food products that are available for sale will be apparent to those skilled in the art.

The warming bins 160 are in communication with a timer 162 that is used in determining the time until expiration of each food product in the warming bins 160. The timer 162 may be used in determining a separate time until expiration of each food product in each warming bin. Of course, more than one timer may be associated with each of the warming bins 160, such that the time until expiration of multiple food products in a warming bin may be tracked by a separate timer. The timer 162 can be any known device for measuring elapsed time or otherwise counting at predetermined intervals. The expiration of a food product is defined as the point at which the food product has "perished" (is no longer considered sellable), such as when the food product is undesirably cold, stale, melted, soggy or otherwise unsavory. Typically, the expiration is deemed to occur a predetermined length of time after a food product has been cooked and placed in the warming bins 160. Different food products will have different lengths of time until they expire (e.g. twenty minutes for hamburgers, thirty minutes for apple pies).

Other characteristics besides the predetermined length of time may be used to determine the expiration of a food product. Expiration of a product may be determined from one or more of the characteristics. The characteristics so used may be different for different food products or food components. The characteristics may be different for the same food product or food component in different situations. For example, temperature probes may be used to track the temperature of a food product and expiration may be said to occur when the temperature reaches a predetermined threshold or range of temperatures. Similarly, the odor or moisture content of the food product may be monitored by a known detector and expiration may be deemed to occur when the odor level or moisture content reaches a predetermine threshold or range. In addition, there may be an input that allows a user to enter that a food product, or group of food products, a food component, or a group of food components has expired, or will expire. Such an input may be useful, e.g., to a restaurant manager that determines or suspects that something is or will expire.

The timer 162 includes a "start timer" input 164 that generates and transmits a start signal for each food product. The start signal is used by the timer 162 to initiate measurement of the age of a food product. The start signal may also be transmitted to another device that counts elapsed time since receiving the start signal, and therefor determines the age of a food product. In one embodiment, the start timer input 164 automatically generates a start signal when a food product is placed in the warming bins 160. For example, the warming bins 160 may include pressure plates (not shown) or other sensors that are actuated when food products are placed thereon. The pressure plates in turn send signals to the start timer input 164. The start timer input 164, in response, generates the start signal(s) for the corresponding food product (s). In another embodiment, the start timer input 164 can comprise one or more input buttons, each corresponding to a food product. A start signal is generated when a cook or other personnel actuates a button of the start timer input 164. In such an embodiment, there would typically be a corresponding button for each of a plurality of locations in the warming bins 160 where food products may be placed. The cook may actuate the appropriate button when he places a food product in the warming bins 160.

The timer 162 may also include an output 166 that provides an indication of the time until expiration of each food product in the warming bins 160. For example, the output 166 may be a liquid crystal display (LCD) that displays alphanumeric text (e.g. minutes and seconds) for each food product in the warming bins 160. Alternatively, the output 166 may simply indicate, for each food product, an age category of the food product. For example, the output 166 may comprise a plurality of light-emitting diodes (LEDs), each corresponding to a food product and each providing constant illumination (e.g. if the food product is very fresh) or intermittent illumination (flashing) (e.g. if the food product is aged). The output 166 may further indicate the age of each food product by color (e.g. green for fresh, red for aged). The output may provide audio output (e.g. beep when the corresponding food product is aged).

The timer 162 is in communication with a demand forecasting apparatus 168 that attempts to predict future demand for various food products and issue instructions to prepare those food products if necessary. The demand forecasting apparatus 168 may be the MCDONALD'S® "Just-in-Time" software which forecasts demand and orders food products in anticipation of the forecasted demand. The demand forecasting apparatus 168 is in communication with a printer 170 for printing waste receipts and a monitor 172 for displaying information regarding predicted food products. For example, the monitor may display instructions to restaurant employees directing them to prepare various types and quantities food products.

The demand forecasting apparatus 168 receives from the timer 162 signals from which may be determined (i) the quantity and types of food products awaiting sale in the warming bins 160; and (ii) the time until expiration of each food product in the warming bins 160. Table 1 below describes several possible formats for the signals transmitted by the timer. Still further formats will be understood by those skilled in the art.

TABLE 1

Timer Signal Formats

| Format | When Transmitted | Example |
|---|---|---|
| "START 1" | when placed in warming bins | Hamburger (transmitted at 4:18:38 PM)<br>Hamburger (transmitted at 4:19:24 PM) |
| "START 2" | periodically or as requested | Hamburger: started at 4:18:38 PM<br>Hamburger: started at 4:19:24 PM |
| "EXPIRES 1" | periodically or as requested | Hamburger: expires at 4:38:38 PM<br>Hamburger: expires at 4:39:24 PM |
| "EXPIRES 2" | periodically or as requested | Hamburger: expires in 0:03:38<br>Hamburger: expires in 0:04:24 |
| "AGE" | periodically or as requested | Hamburger: age is 0:16:22<br>Hamburger: age is 0:15:36 |

As indicated in Table 1, the timer 162 may periodically transmit signals (e.g. every minute) or may transmit signals as demanded (e.g. upon receiving a request from the demand forecasting apparatus 168).

Based on the signals received from the timer 162, the demand forecasting apparatus 168 may (i) determine which food products have expired, and (ii) command the printer 170 to generate corresponding waste receipts. Waste receipts are typically slips of paper upon which are registered indicia describing the type and quantity of food products that are to be disposed of, rather than sold. The demand forecasting apparatus 168 furthermore stores an indication of the type and quantity of food products that are to be disposed of so that inventory may be properly tracked and accounted for. The demand forecasting apparatus 168 also appropriately adjusts its instructions to prepare various types and quantities of food products in accordance with predicted demand and disposed of food products.

The demand forecasting apparatus 168 may be used to calculate the probability of a food product that has already been prepared being sold before the food product expires. Similarly, the demand forecasting apparatus 168 may be used to determine the probability of a food component being used for a food product before the food component expires. Setting the minimum price for a food product could thus be done in accordance with the demand forecasting apparatus output. For example, the demand forecasting apparatus may output a probability of a food product being sold within a predetermined amount of time (e.g. 60% probability of hamburger being sold within the next four minutes). The predetermined amount of time may be the time until expiration. The minimum price for the food product or food component could thus be set and/or adjusted based on the probability for the food product or food component being sold. Further, the minimum price may be set as a function of the probability of the food product being sold and the retail price. For example, if the retail price of a hamburger is $1.00 and the probability of the hamburger being sold is 50%, the minimum price may be set at $0.50.

Figure 8:
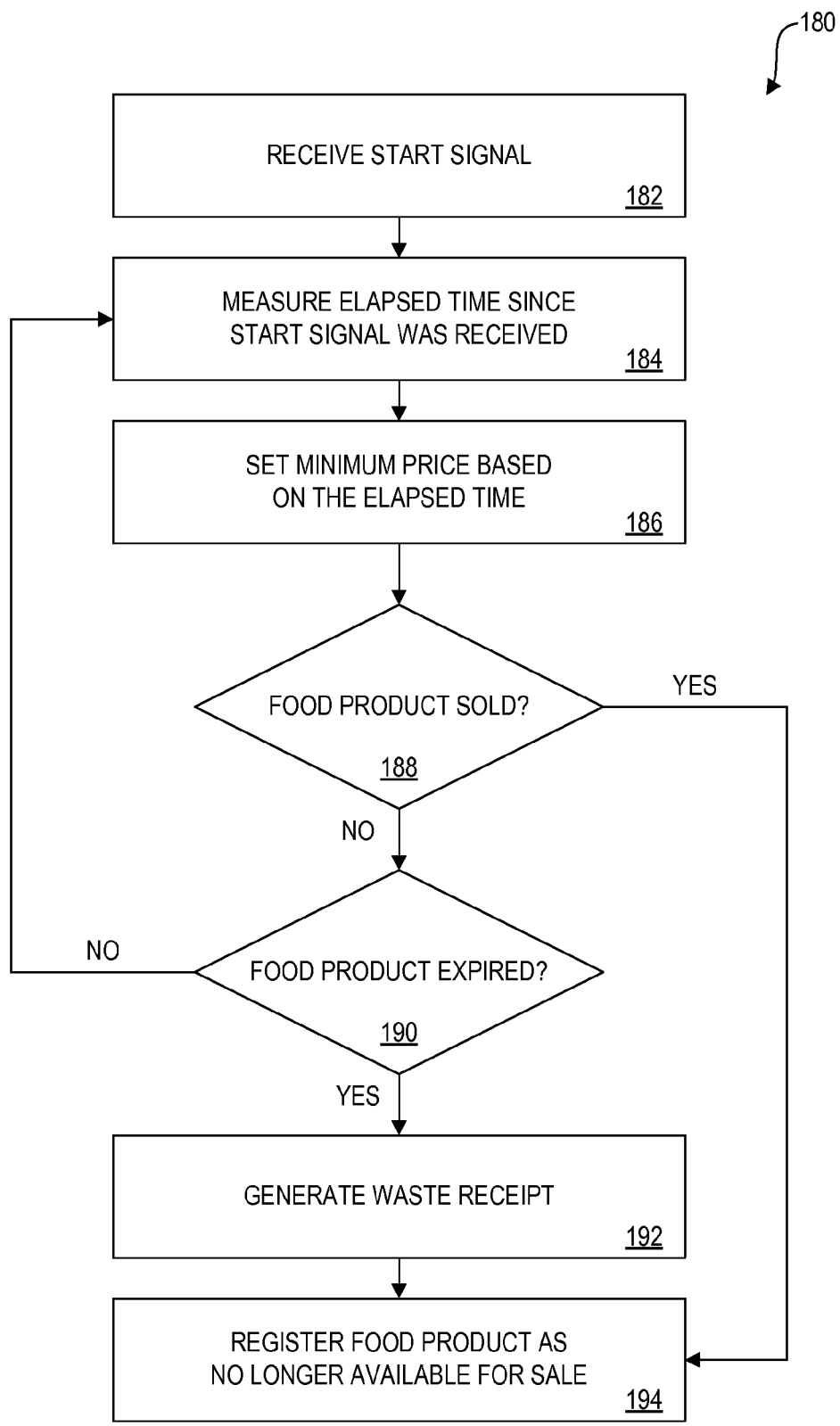
FIG. 8 is a flow chart illustrating a method for selling an aging food product provided in accordance with the present invention.

Referring to FIG. 8, a method 180 for identifying aged food products that are desirable to sell at a reduced price may be performed by the demand forecasting apparatus 168 (FIG. 7) and/or the store server 18 (FIG. 1), as appropriate. The time until expiration of each food product is first determined. One way of determining such a time is to receive the start signal for each food product from the timer 162 of FIG. 7 (step 182) and measure the corresponding elapsed time since the start signal was received (step 184). Based on the elapsed time, the time until expiration may be determined. For example, if hamburgers are deemed to expire twenty minutes after being placed in the warming bins 160 (FIG. 7), and the elapsed time is seven minutes, then the time until expiration is thirteen minutes (20−7=13). Alternative ways for determining the time until expiration will be readily understood, particularly with reference to the various possible formats described in Table 1 above.

Based on the time until expiration, a minimum price (described in further detail below) of each food product is set (step 186). If a food product is not sold (step 188), it is determined whether the food product has expired (step 190). One way of determining whether a food product has expired is to determine whether the corresponding elapsed time is less than zero, or some other predetermined threshold. If a food product has not expired, the elapsed time continues to be measured (step 184). If a food product has expired, a waste receipt is generated (step 192), and that food product is registered as no longer available for sale (step 194). Similarly, if a food product is sold (step 188), that food product is registered as no longer available for sale (step 194).

Figure 9:
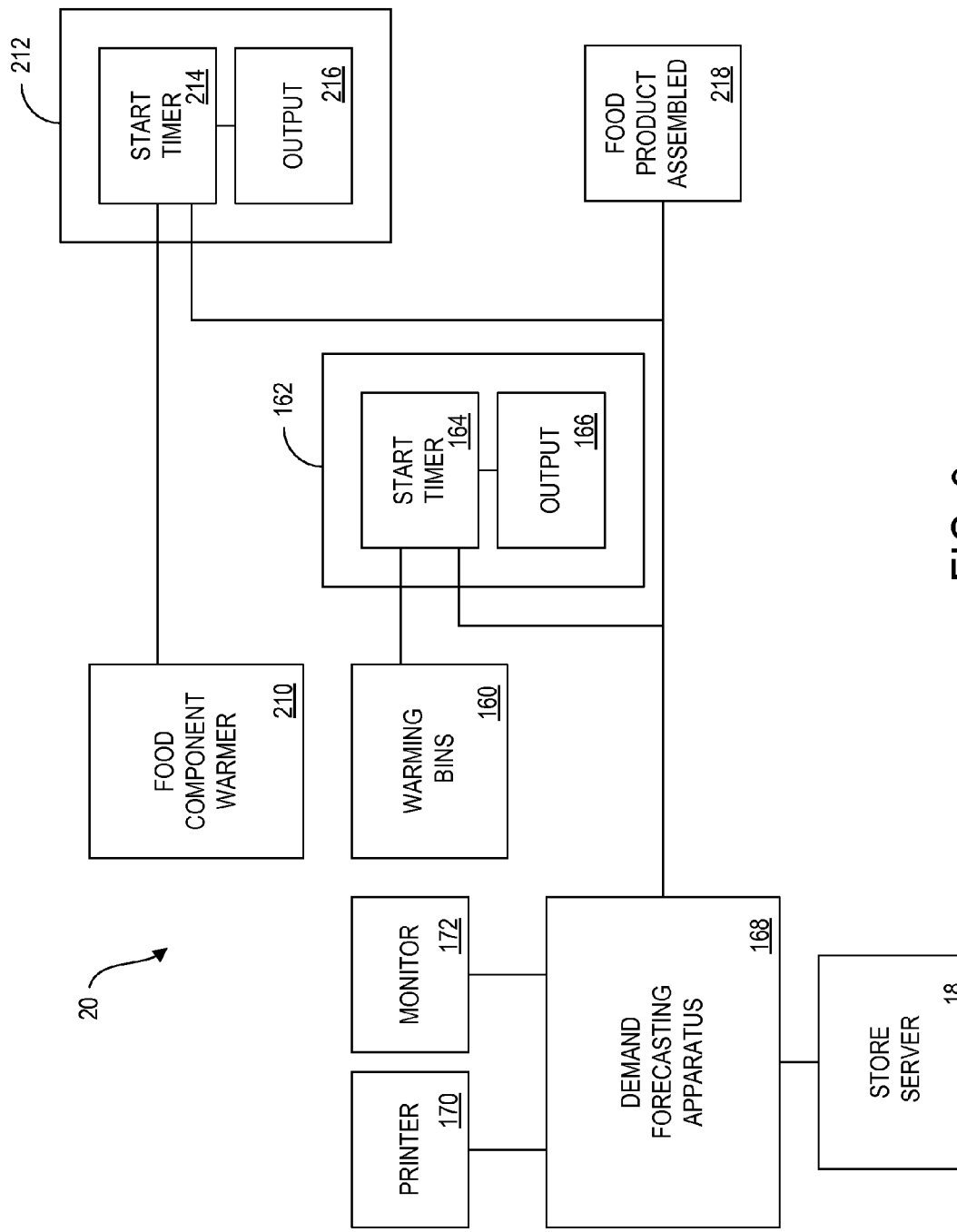
FIG. 9 is a schematic illustration of another embodiment of the automated kitchen apparatus of FIG. 7.

Referring to FIG. 9, another embodiment of the automated kitchen apparatus 20 includes the demand forecasting apparatus 168, the printer 170 and the monitor 172 described above with reference to FIG. 7. A food component warmer 210 holds cooked food components, and keeps those food components warm while they await being assembled into food products. The food component warmer 210 may be the Welbilt UHC4TP universal holding cabinet or may be a device utilizing controlled vapor technology ("CVAP"), a cooking, holding and thermalizing technology developed by Winston Industries of Louisville Ky. for maintaining food temperature and moisture content.

The food component warmer 210 is in communication with a timer 212, which is similar to the timer 62 (FIG. 7). The timer 212 is used in determining the time until each food component in the food component warmer 210 must be assembled. For example, it may be desirable to limit the time that a hamburger patty may be in the food component warmer 210 to thirty minutes. After thirty minutes, the hamburger patty must be used to assemble a hamburger, or it must be discarded since it has perished. Typically, the time until assembly is required is deemed to occur a predetermined length of time after a food component has been cooked and placed in the food component warmer 210. Different food components will have different lengths of time until they expire (e.g. thirty minutes for hamburger patties, forty minutes for chicken patties). However, as described above in relation to a food product, characteristics other than time after a food component has been cooked and placed in the food component warmer 210 may be utilized to determine the time until assembly. Examples of such characteristics include the moisture content, odor level, or temperature of the food component.

The timer 212 includes a "start timer" input 214 that generates and transmits a start signal for each food component. The start signal is used by the timer 212 to initiate measurement of the age of a food component. The start signal may also be transmitted to another device that counts elapsed time since receiving the start signal, and therefor determines the age of a food component. In one embodiment, the start timer input 214 automatically generates a start signal when a food component is placed in the food component warmer 210. For example, the food component warmer 210 may include pressure plates (not shown) or other sensors that are actuated when food components are placed thereon. The pressure plates in turn send signals to the start timer input 214. The start timer input 214, in response, generates the start signal(s) for the corresponding food component(s). In another embodiment, the start timer input 214 can comprise one or more input buttons, each corresponding to a food component. A start signal is generated when a cook or other personnel actuates a button of the start timer input 214. In such an embodiment, there would typically be a corresponding button for each of a plurality of locations in the food component warmer 210 where food components may be placed. The cook would actuate the appropriate button when he places a food component in the food component warmer 210.

The timer 212 also includes an output 216 that provides an indication of the time until expiration (i.e. until the food component is aged and should be assembled into a food product) of each food component in the food component warmer 210. The output 216 is similar to the output 166 (FIG. 7).

When a food component is near or at expiration, it is assembled into a food product if possible. If a cook or other restaurant personnel assembles the food component into a food product, he so indicates using a "food product assembled" input 218. The food product assembled input 218 may comprise one or more input buttons, each corresponding to a food component. Once assembled, the food product is placed in the warming bins 160, and the start timer input 164 generates and transmits a start signal, as described above with reference to FIG. 7. In one embodiment, the food product assembled input 218 is the start timer input 164. In another embodiment, the food product assembled input 218 is a separate device, as will be understood by those skilled in the art.

Figure 10A:
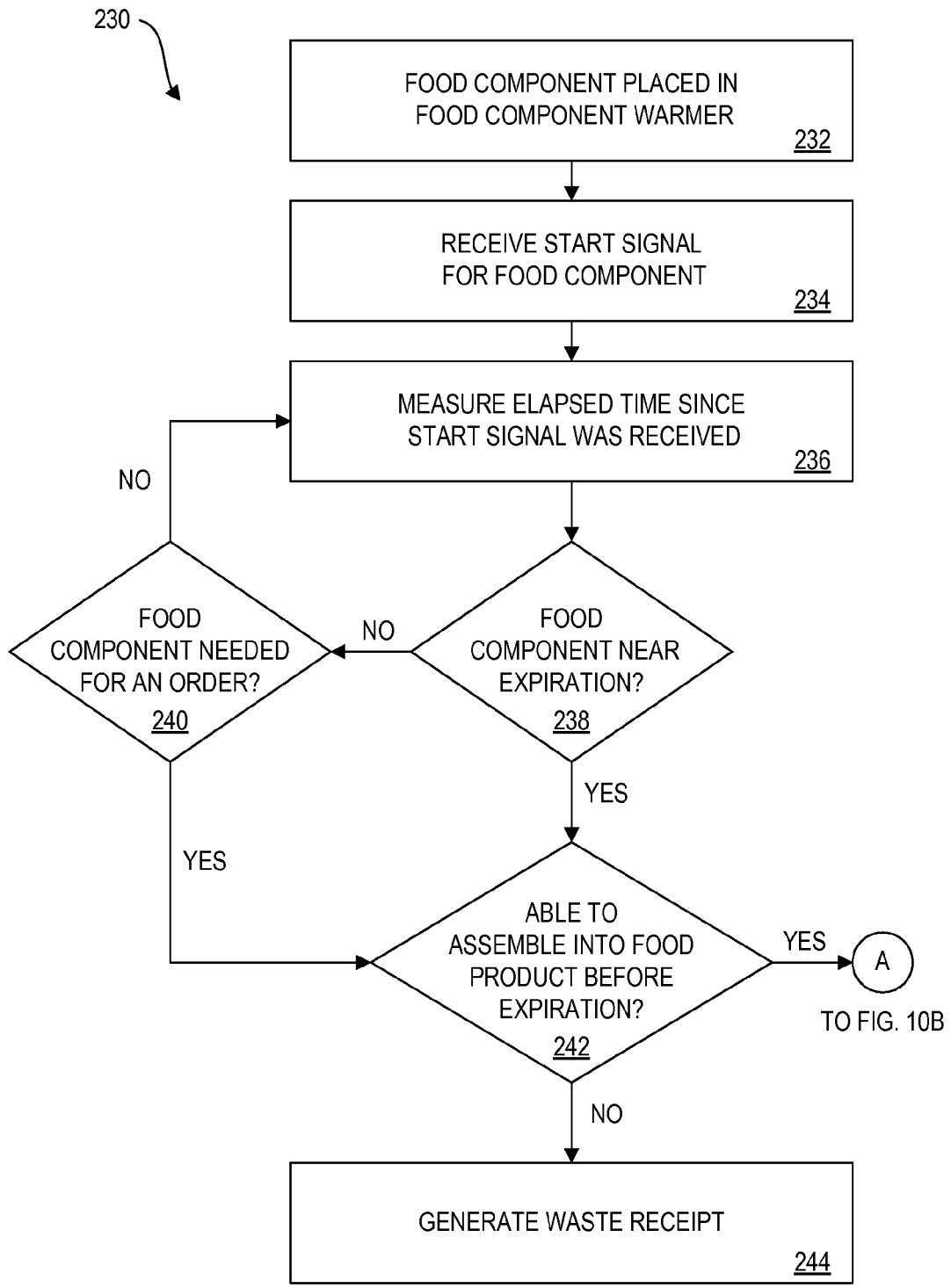
FIGS. 10A and 10B are a flow chart illustrating another embodiment of a method for selling an aging food product provided in accordance with the present invention.
Figure 10B:
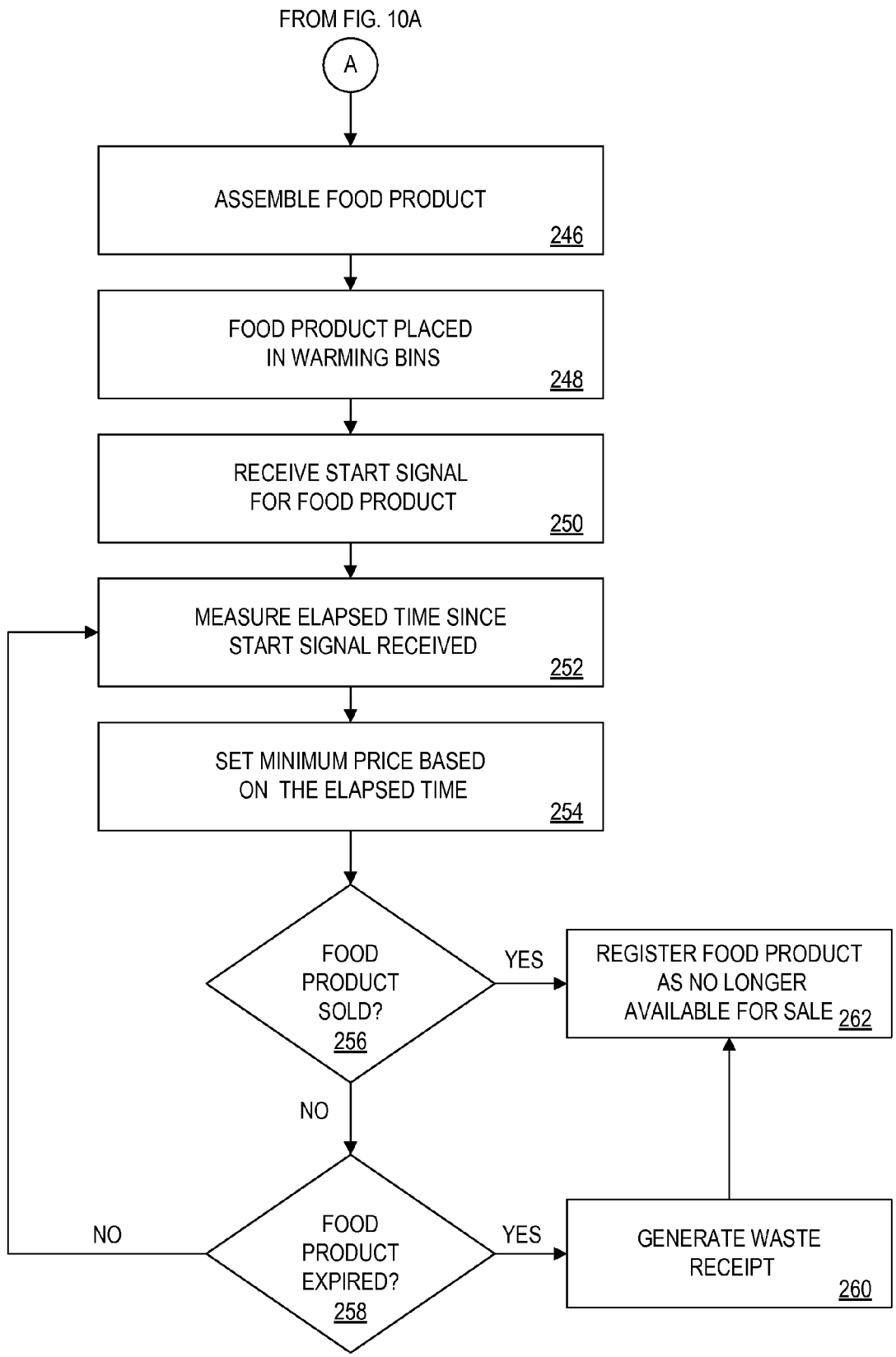

Referring to FIGS. 10A and 10B, another method 230 for identifying aged food products that are desirable to sell at a reduced price may be performed by the demand forecasting apparatus 168 (FIGS. 7 and 9) and/or the store server 18 (FIG. 1), as appropriate. At step 232, one or more food components are placed in the food component warmer 210 (FIG. 9), and the time until expiration of each food component is determined. One way of determining such a time is to receive the start signal for each food component (step 234) from the timer 212 (FIG. 9) and measure the corresponding elapsed time since the start signal was received (step 236). Based on the elapsed time, the time until expiration may be determined. For example, if hamburger patties are deemed to expire thirty minutes after being placed in the food component warmer 210 (FIG. 9), and the elapsed time is seven minutes, then the time until expiration is twenty three minutes (30−7=23). Another method for determining the time until expiration of a food product is to determine the time until expiration of more than one food component of the food product and select the lowest time until expiration of the food components as the time until expiration of the food product. The minimum price for the food component may then be set based on this lowest time until expiration as well. Alternative ways for determining the time until expiration will be readily understood, particularly with reference to the various possible formats described in Table 1 above.

If a food component is not near or at expiration (step 238), and if the food component is not needed to fulfill an order (step 240), then the food component remains in the food component warmer 210. Otherwise, it is assembled into a food product if possible (step 242). It may not be possible to assemble an expiring food component (e.g. restaurant personnel are too busy). Accordingly, if a food component expires, it is discarded, and a corresponding waste receipt is generated (step 244).

If a cook or other restaurant personnel is able to assemble the food component into a food product (step 246), he so indicates using a "food product assembled" input 218 (FIG. 9), the food product is placed in the warming bins 160 (step 248), and the time until expiration of the food product is determined. One way of determining such a time is to receive the start signal for the food component (step 250) from the timer 212 (FIG. 9) and measure the corresponding elapsed time since the start signal was received (step 252). Based on the elapsed time, the time until expiration may be determined. Similarly, the age of a food product is measured from the time the food product is assembled and placed in the warming bins 160.

Based on the time until expiration, a minimum price (described in further detail below) of each food product is set (step 254). If a food product is not sold (step 256), it is determined whether the food product has expired (step 258). One way of determining whether a food product has expired is to determine whether the corresponding elapsed time is less than zero, or some other predetermined threshold. If a food product has not expired, the elapsed time continues to be measured (step 252). If a food product has expired, a waste receipt is generated (step 260), and that food product is registered as no longer available for sale (step 262). Similarly, if a food product is sold (step 256), that food product is registered as no longer available for sale (step 262).

As described above, a minimum price of a food product is set based on the time until expiration of the food product. The description below will make reference to the time until expiration. However, since the time until expiration may be used to calculate the age of a food product, and vice versa, those skilled in the art will readily understand how to apply the teachings herein to embodiments where the age is used.

Referring to FIG. 11, a table 280 represents a record of an embodiment of the price adjustment database 96 (FIG. 4), which will typically include a plurality of such records. Each record defines price adjustments for a food product at different ages of that food product. The table 280 includes a record identifier 282 that identifies the food product, typically by the appropriate food product identifier 118 (FIG. 5). The table 280 further includes entries 284 and 286, each defining a price adjustment for different ages of the food product identified by the record identifier 282. The entries 284 and 286 each include (i) an age 288 defining an age or age range; and (ii) a price 290 of the food product having that age. For example, the entry 284 indicates that hamburgers that have been in the warming bins fifteen minutes or less are to be sold at retail price. Any older hamburgers are sold for a customer's change due, as is described in more detail below.

Referring to FIG. 12, a table 300 represents another embodiment of the price adjustment database 96 (FIG. 4). The table 300 defines price adjustments for food products at different ages. The table 300 includes entries 302, 304 and 306, each defining a price adjustment for different ages. Each entry includes (i) an age 308 defining an age or age range; and (ii) a price 310 of any food product having that age. For example, the entry 304 indicates that food products that have been in the warming bins between sixteen minutes and seventeen minutes are to be sold at 50% of retail price. Retail prices of food products are stored in the inventory database 92 (FIG. 5).

Referring to FIG. 13, a table 320 represents a record of another embodiment of the price adjustment database 96 (FIG. 4), which will typically include a plurality of such records. Each record defines price adjustments for a food product at different ages of that food product. The table 320 includes a record identifier 322 that identifies the food product, typically by the appropriate food product identifier 118 (FIG. 5). The table 320 further includes entries 324, 326 and 328, each defining a price adjustment for different ages of the food product identified by the record identifier 322. Each entry includes (i) an age 330 defining an age or age range; (ii) a minimum price 332 of the food product having that age; and (iii) a maximum price 334 of the food product having that age. In such an embodiment, each entry defines a range of prices for which a food product having a particular age may be sold. For example, the entry 324 indicates that hamburgers that have been in the warming bins fifteen minutes or less are to be sold for the retail price (i.e. between $0.69 and $0.69). Similarly, the entry 328 indicates that hamburgers that have been in the warming bins more than eighteen minutes are to be sold for any amount less than the retail price (i.e. between $0.00 and $0.69).

As will be understood from the above description, the price adjustments for food products may vary with the age of the food product in numerous ways. For example, the price of a food product may decrease proportionally with its age (e.g. $0.05 per minute). Alternatively, there may be a schedule of fixed reductions in the retail price that varies with age (e.g. $0.25 for ages 5-10 minutes, $0.50 for ages 11-20 minutes).

It should be noted that the determination of a minimum price for a food product or a food component may be performed at a time of a purchase or order and be based on a pricing formula rather than consisting of retrieving the minimum price or a price adjustment from a database. For example, a POS terminal may have access to the times until expiration or the times that food products or food components were placed in warming bins. The POS terminal may further be programmed with a function or formula via which a minimum price for such food components or food products may be calculated. Thus, when the POS terminal determines that a purchase total and round-up amount has been calculated for a purchase, the POS terminal may calculate the minimum prices for the available food components and food products based on such a formula or function and output an offer for a food product in exchange for the round-up amount if at least one if the calculated minimum prices is not greater than the round-up amount.

Referring again to FIGS. 11, 12 and 13, the illustrated entries each describe age ranges, which may be referred to as "age categories". For example, the entry 326 defines an age range from sixteen minutes to eighteen minutes old (a first age category), and the entry 326 defines an age range from sixteen minutes to eighteen minutes old (a second age category). The aged inventory database 94 (FIG. 6) stores indications of food products that have aged excessively and thus are desirable to sell at a reduced price, rather than be discarded. The aged inventory database 94 may be considered as storing indications of food products that correspond to one or more predetermined age categories (e.g. all age categories except the first age category).

The POS terminals 12, 14 and 16 (FIG. 1) have access to the aged inventory database 94, which describes food products that have aged excessively and thus are desirable to sell at a reduced price, rather than be discarded. The POS terminals 12, 14 and 16 also have access to the price adjustment database 96, which defines price adjustments for food products at different ages of that food product. Accordingly, the POS terminals 12, 14 and 16 may determine which excessively aged food products are available, as well as prices at which to sell those food products.

In one embodiment, the food product or food component to offer to a customer may be selected based on the specific ages or times until expiration of the food products or food components whose minimum prices are not greater than the round-up amount. For example, if both french fries or a hamburger is available to offer as an upsell in a transaction, and the time until expiration of the french fries is two minutes while the time until expiration of the hamburger is three minutes, the french fries may be selected since they are closer to expiration. Such a selection may further be based on a forecasted demand for each of the products or a respective probability that each product will be sold before it expires. Thus, returning to the previous example of the french fries and the hamburger, if the probability of the french fries being sold before expiration is 90% and the probability of the hamburger being sold before expiration is 25%, the hamburger may be selected as the upsell even though the time until expiration for the hamburger is longer than that of the french fries.

In another embodiment, both the probability of the product being sold before expiration and the price (or expected price) for which it will be sold may be used to determine whether the product is selected as the upsell.

Figure 14:
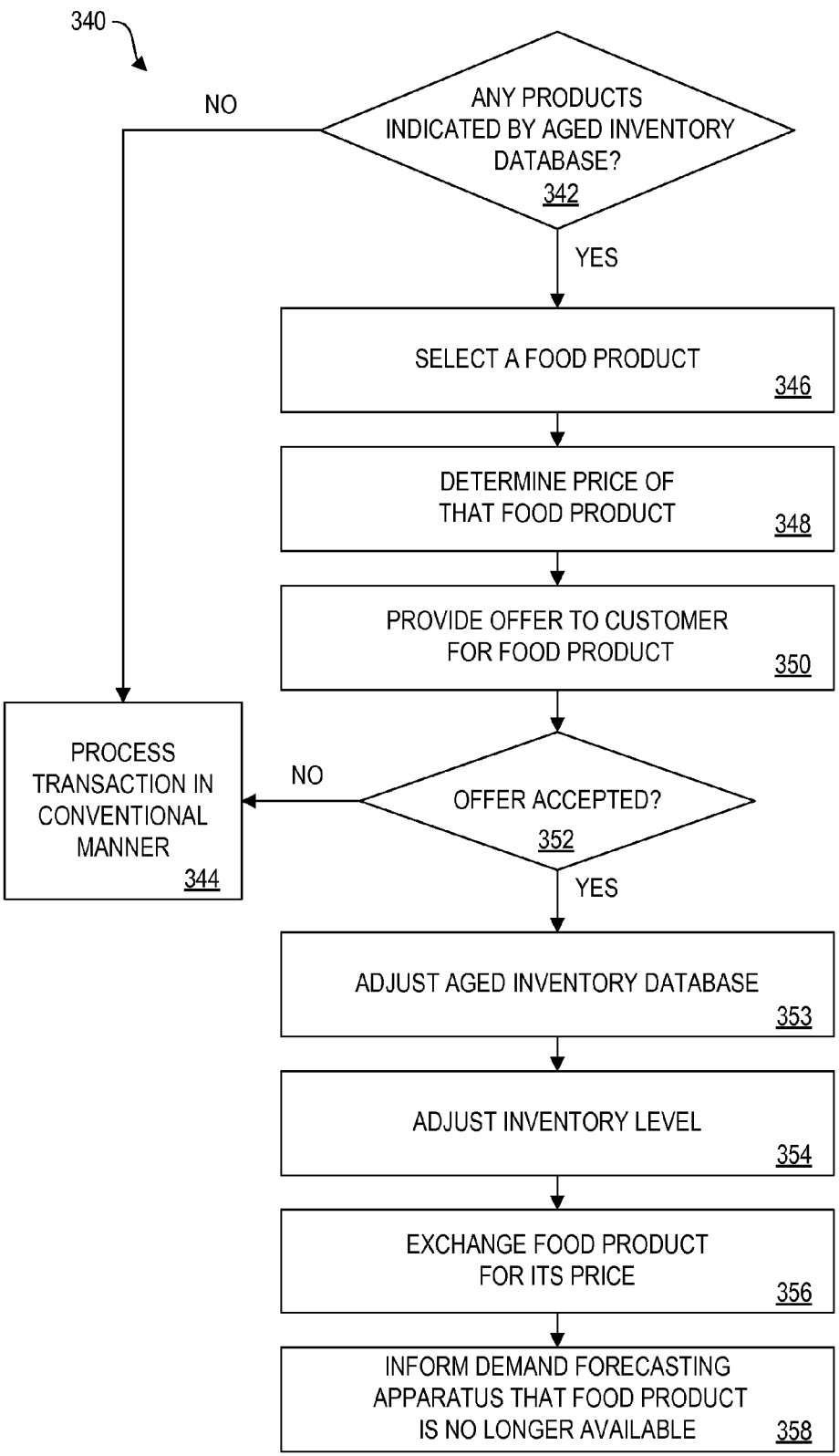
FIG. 14 is a flow chart illustrating another embodiment of a method for selling an aging food product provided in accordance with the present invention.

FIG. 14 describes a method 340 performed by a POS terminal of the restaurant apparatus 10 (FIG. 1) for selling an aging food product. If there are not any food products indicated by the aged inventory database 94 (step 342), then the transaction is processed in a conventional manner (step 344). If there are one or more food products indicated by the aged inventory database 94, then a food product is selected (step 346). If more than one food product is indicated, the food product may be, for example, selected at random or selected based on what the customer has ordered.

The price of the selected food product is determined (step 348). As described above, the price adjustment database 96 (FIG. 4) is used to determine the price of the food product based on the age of that food product. In one embodiment, the aged food product has a price that is exactly the minimum price specified by the price adjustment database 96. In another embodiment, the aged food product has a price that is greater than or equal to a minimum price (i.e. a higher price may be charged under certain circumstances). Similarly in still another embodiment, the aged food product has a price that is in a range from a minimum price to a maximum price.

Once the (reduced) price of the selected food product has been determined, an appropriate offer is provided to the customer (step 350). For example, the POS terminal may display a textual message indicating the selected food product and price to the customer and/or cashier. If the customer does not accept the offer (step 352), the cashier so indicates by actuating an appropriate button on the POS terminal, and the transaction is processed in a conventional manner (step 344). If the customer does accept the offer, the aged inventory database is appropriately adjusted (step 353) to reflect the sold food product. For example, the corresponding quantity indicated for a food product is reduced by one if one food product is sold. In one embodiment a separate inventory database, such as a database of food components available for use in the restaurant, is appropriately adjusted as well (step 354). The demand forecasting data may also be updated based on the customer's acceptance or rejection of the offer.

The selected food product is exchanged for the determined price (step 356), and a signal is sent to the demand forecasting apparatus 168 (FIGS. 7 and 9) indicating that the food product has been sold and is no longer available (step 358). Thus, the demand forecasting apparatus 168 will not erroneously include sold food products in instructing the preparation of anticipated food products.

The parent application of the present application, U.S. patent application Ser. No. 08/920,116, entitled "METHOD AND SYSTEM FOR PROCESSING SUPPLEMENTARY PRODUCT SALES AT A POINT-OF-SALE TERMINAL," filed on Aug. 26, 1997 and issued as U.S. Pat. No. 6,119,099 on Sep. 12, 2000, describes a method and apparatus in which a customer at a POS terminal is offered an "upsell" in exchange for an amount of change he is due. The POS terminal determines an upsell in dependence on a purchase of the customer, and also determines an upsell price (the amount of change due) based on the purchase. For example, a customer purchasing a first product for $1.74 and tendering $2.00 may be offered a second product in lieu of the $0.26 change due ("round-up amount"). The upsell price, $0.26, thus depends on the purchase price $1.74. Similarly, the $2.00 "rounded price" may also depend on the purchase price $1.74. In this example, the rounded price is the next-greater whole number amount of dollars greater than the purchase price $1.74.

The method and apparatus of the parent application may be advantageously used with the present invention described herein to allow customers to purchase aged inventory for their change due. In particular, since customers generally do not know which food products are aged, it is difficult or impossible for customers to predict which food products will be offered to them. Accordingly, there is a significant randomness in the offers, which prevents customers from successfully taking advantage of the offering process. To further ensure that customers cannot successfully guess what offer will be presented to them, the selection of what food product to offer may comprise a random selection of a food product from the food products that are available as an upsell for a given transaction. Further, the process of the present invention may include a random determination of whether or not to offer an upsell at all, even if a food product is available as an upsell.

Figure 15A:
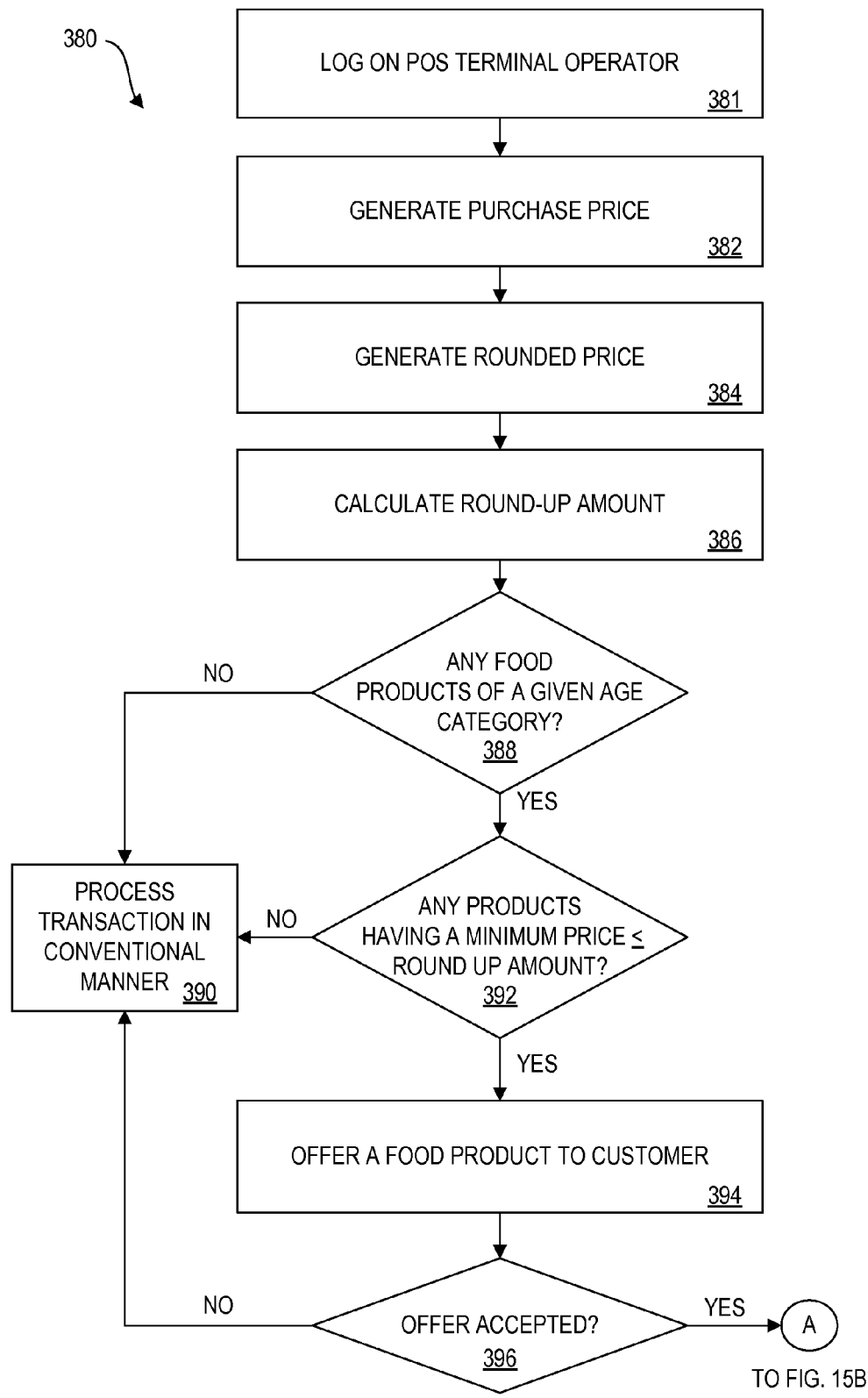
FIGS. 15A and 15B are a flow chart illustrating another embodiment of a method for selling an aging food product provided in accordance with the present invention.
Figure 15B:
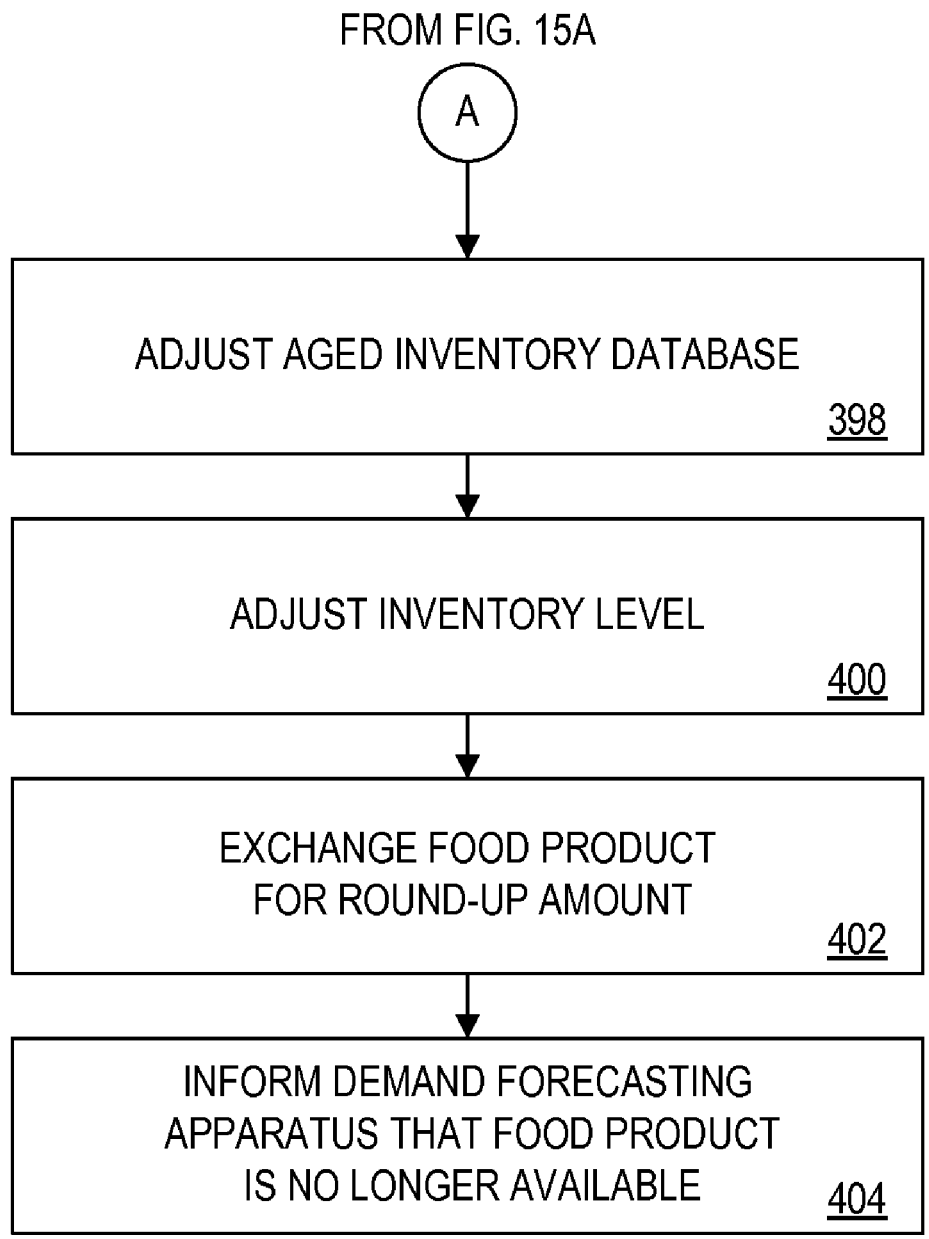

FIGS. 15A and 15B describe a method 380 performed by a POS terminal of the restaurant apparatus 10 (FIG. 1) for selling an aging food product. The POS terminal logs on a POS terminal operator (e.g. a cashier) (step 381), which is typically performed once when an operator begins or resumes operation of the POS terminal (i.e. at the beginning of the operator's shift, or after he has returned from a break). Logging on includes inputting into the POS terminal a unique operator identifier. Thus, subsequent operations performed by or on the POS terminal may be associated with the operator. Benefits to such operating tracking are described below.

During a customer transaction, the POS terminal generates a purchase price and a rounded price (steps 382 and 384), and therefrom calculates a round-up amount (step 386). The round-up amount is the difference between the purchase price and the rounded price. The POS terminal then determines whether there exist any food products that correspond to one or more predetermined age categories (step 388). For example, there may be a first age category that includes food products greater than fifteen minutes old, and a second age category that includes food products less than fifteen minutes old. Food products corresponding to the first age category may be deemed excessively aged, and as such should be exchanged for a customer's change due.

If there are no food products that correspond to the predetermined age categories (i.e. no aged inventory), then the customer transaction is processed in a conventional manner (step 390). Otherwise, the POS terminal determines whether any of these aged food products have a minimum price that is less than or equal to the round-up amount (step 392). If any do, at least one is selected and offered to the customer (step 394). For example, all of the food products that correspond to the predetermined age categories and which have a minimum price that is less than or equal to the round-up amount may be placed into a pool of available upsell products for the transaction. If there is more than one product in this pool of available upsell products, the POS terminal may then select one or more specific products to be presented to the customer as an upsell. Such a selection may be based on characteristics of the transaction (e.g. what food products did the customer purchase), characteristics of the customer (e.g. the gender of the customer), or other selection criteria set by an operator of the system. Examples of other criteria include weightings or preferences for a certain food product or type of food product. Such weightings or preferences may be based on, for example, the amount of that food product currently in inventory, relative amounts of food products currently in inventory or a promotion for a particular food product or type of food product currently in progress.

Once the food product is selected, the POS terminal may output an indication of the food product to the operator and/or customer via its display device. For example, the POS terminal may output the text "Would you like a hamburger for your $0.32 change?" Selecting a food product to offer may be based on many criteria, as described below and in the above-cited parent application.

If the offer is accepted by the customer (step 396), the operator may so indicate via a device (e.g. the input device of the POS terminal) that transmits an acceptance signal to the POS terminal. The aged inventory database is appropriately adjusted (step 398) to reflect the sold food product. In one embodiment, a separate inventory database, such as a database of food components available for use in the restaurant, is appropriately adjusted as well (step 400). The selected food product is exchanged for the round-up amount (step 402), so the customer pays the rounded price for the total purchase including the aged food product. Finally, a signal is sent to the demand forecasting apparatus 168 (FIGS. 7 and 9) indicating that the food product has been sold and is no longer available (step 404).

The above-described step 381 of logging on an operator of the POS terminal allows the acceptance rate of offers to be tracked. For example, a first operator may be very adept at persuading customers to accept an offer for aged food products, while a second operator may not. Accordingly, the acceptance rate of the first operator will be higher than the acceptance rate of the second operator. Tracking the acceptance rate is advantageous if operators receive bonuses or are otherwise compensated based on their average acceptances per offer, number of acceptances per hour, and/or money collected due to accepted offers per hour. Such bonuses may be automatically calculated by a payroll system (e.g. on the store server 18 of FIGS. 1 and 4) that receives acceptance rates from the POS terminals.

Furthermore, operators that are particularly skilled at providing offers to customers may be prompted by the POS terminal to provide more difficult offers, such as persuading customers to "round up" their purchase price to a greater amount (e.g. to the nearest $5 rather than just the nearest $1). Thus, the customer would have a greater round-up amount and would be able to purchase more food products and/or greater value food products.

Logging on each operator may also advantageously grant each operator the ability to access certain POS terminal functions. For example, it may be advantageous to limit the ability to provide offers for aged food products to certain operators. The restaurant management may not want inexperienced operators to engage in anything but the most basic operations at the POS terminal.

As also described above, selecting a food product to offer may be based on many criteria. For example, various types of information about the customer(s) may be input to the POS terminal and used in selecting an upsell that is likely to be accepted. In one embodiment, the operator may indicate (e.g. by pressing one of a plurality of buttons on the POS terminal) the number of people in the customer's "party" (e.g. one customer, two customers, three customers, more than three). Upsells may then be selected based on the number of people. For example, if two people are in the customer's party, then an upsell of two hamburgers may be more appropriate than one or three food products. In embodiments where the customer is uniquely identified and the customer's previous purchase history may be accessed via this identifier, an upsell may be selected based on the customer's previous purchases or previous upsell offers accepted or rejected by the customer. Other information about the customer(s) which may be used in selecting an upsell include the weight, age and gender of the customer. Upsells may also be selected based on criteria such as the time of day, the time of year, the day of the week, the temperature or weather conditions, or other external events. For example, if it is a very hot day outside, and both an ice cream cone and a hot apple pie are available as an upsell, the ice cream cone may be selected for the offer to the customer.

In another embodiment of the present invention, aged food products may be sold in packages that include a plurality of food products. Selling packages of items is described in U.S. patent application Ser. No. 08/923,683 entitled "CONDITIONAL PURCHASE OFFER (CPO) MANAGEMENT SYSTEM FOR PACKAGES" filed on Sep. 4, 1997 and issued as U.S. Pat. No. 6,553,346 on Apr. 22, 2003 in the name of Jay S. Walker et al.; and U.S. patent application Ser. No. 09/012,163 entitled "METHOD AND APPARATUS FOR AUTOMATICALLY VENDING A COMBINATION OF PRODUCTS" filed on Jan. 22, 1998 and issued as U.S. Pat. No. 6,397,193 on May 28, 2002 in the name of Jay S. Walker et al., each incorporated herein by reference. For example, a plurality of aged food products may be offered to a customer for a package price that is lower than the sum of the (reduced) prices of the individual food products. Such a package price is typically based on the individual reduced prices, and thus is based on the times until expiration of the individual food products. Alternatively, a package may include an aged food product and a food product that is not aged. The corresponding package price may be, for example, the retail price of the food product that is not aged. If so, the offer may be "buy product X, get product Y free". Alternatively, the package price may be the customer's change due if the change due is greater than the retail price of the food product that is not aged.

In one embodiment, the POS terminal generates a round-up amount, and a package is constructed based on the round-up amount and the retail prices of food products in the package. In particular, the sum of the retail prices is greater than the round-up amount. The package is offered in exchange for the round-up amount. If accepted, the customer will recognize a significant benefit since the price paid for the package (the round-up amount) is less than the retail prices the customer would have expected to pay. In this embodiment, the package may include one or more aging food products. Of course, the package price may be determined in a number of other ways understood by those skilled in the art.

In many of the embodiments described above, reference was made to an offer provided to the customer, the offer being an exchange of an aged food product for a customer's change due. In another embodiment, the minimum price of an aged food product may be output to the customer before his transaction. In particular, it can be advantageous to transmit the minimum price to a price display, such as the DIGITAL MENUBOARD™ by Siren Technologies of Chicago, Ill. The DIGITAL MENUBOARD™ allows promotional messages to be displayed, such as sale prices for food products. Furthermore, the price display would be a convenient way to display product prices that decrease with time or otherwise change. In summary, the customer may see various aged food products advertised at reduced prices before his transaction, and thus aged inventory may be sold upon initiation by the customer.

Some customers may change their mind after having accepted an offer for one or more food products in exchange for change due. If a customer changes his mind before the POS terminal operator has started serving another customer, then the change due amount is still readily available. Accordingly, the operator can easily refund the round-up amount. However, if the customer changes his mind a significant amount of time after the transaction, the round-up amount paid for the food product(s) is typically less readily available to the operator.

If the customer has a receipt for his transaction, the round-up amount is readily determined therefrom, and an appropriate refund may be made. However, many times a receipt will not be printed or will otherwise be unavailable. Accordingly, other methods of determining a round-up amount may be required.

One method for determining the corresponding round-up amount is to re-enter the customer's original food products ordered or the retail prices of the food products originally ordered. The POS terminal may then access a database of daily transactions to determine (i) whether such a transaction was really made; (ii) the round-up amount associated with the transaction; (iii) whether the alleged food product(s) were offered in exchange for the round-up amount; and (iv) whether the offer was accepted. If more than one transaction matches the customer's alleged transaction, the customer may further provide an approximate time of day, cashier name, or cash register identifier of the transaction to properly identify his transaction. If appropriate, the POS terminal operator may then refund the appropriate amount to the customer.

Although the present invention has been described with respect to a preferred embodiment thereof, those skilled in the art will note that various substitutions may be made to those embodiments described herein without departing from the spirit and scope of the present invention. For example, although in the embodiments described above reference was made to apparatus that keep food products warm while they await being sold, the present invention may likewise employ apparatus that keep food products (e.g. ice cream) cold while they await being sold.

Furthermore, although the exemplary environment described throughout the present application has been that of a quick service restaurant, it should be understood that the present invention may be utilized in other types of environments. For example, an upscale eat-in restaurant, a coffee shop or a diner could also benefit from such an invention. The type of product sold by the entity practicing this invention may also vary and is not restricted to food products. As discussed above, a product may be a good or a service. Thus, the present invention could be applied to service retailers such as automobile service providers, beauty salons, and photo processing providers. For example, an automobile service provider may utilize the present invention to determine that a mechanic or other service personnel will be available for another hour and that a service bay will be empty for a predetermined amount of time and accordingly offer extra services for a price based on a round-up amount to a price of a service already ordered (e.g. discounted tire rotation as upsell to ordered oil change for round-up amount from purchase price of oil change).

What is claimed is:

1. A computer readable medium storing instructions configured to direct a processor to perform a method, the method comprising:
   determining a time until expiration of at least one food component of a food product;
   determining a time until expiration of the food product based on the time until expiration of the at least one food component;
   setting a price range for the food product, wherein the price range defines a minimum price and a maximum price; and
   causing an offer to exchange the food product for a round-up amount if the round-up amount is within the price range to be output, in which the round-up amount is a difference between a purchase price and a rounded price of a purchase.

2. An apparatus comprising:
   a processor; and
   a computer readable medium in communication with the processor, the computer readable medium storing instructions configured to direct the processor to perform a method, the method comprising:
   determining a time until expiration of at least one food component of a food product;
   determining a time until expiration of the food product based on the time until expiration of the at least one food component;
   setting a price range for the food product, wherein the price range defines a minimum price and a maximum price; and
   causing an offer to exchange the food product for a round-up amount if the round-up amount is within the price range to be output, in which the round-up amount is a difference between a purchase price and a rounded price of a purchase.

3. A method comprising:
   determining, by a controller comprising at least one processor, a food product;
   determining, by the controller, a price range defining a maximum price and a minimum price; and
   storing, on a storage device, an indication that the food product may be offered, as one of a set of one or more food products, in exchange for a round-up amount associated with a purchase if the round-up amount is in the price range.

4. The method of claim 3, further comprising:
   establishing at least one age category for the food product.

5. The method of claim 4, in which determining the price range comprises:
   determining a respective price range corresponding to each at least one age category established for the food product.

6. The method of claim 5, in which the maximum price is the same as the minimum price.

7. The method of claim 4, in which the maximum price is a retail price for the food product.

8. The method of claim 3, in which the set of food products comprises a plurality of food products.

9. The method of claim 3, further comprising:
   selecting the set of one or more food products.

10. The method of claim 9, in which selecting the set of one or more food products comprises:
    identifying a plurality of food products based on the round-up amount and a respective retail price for each food product.

11. A computer readable medium storing instructions configured to direct a processor to perform:
    determining, by a processor, a food product;
    determining, by the processor, a price range defining a maximum price and a minimum price; and
    storing, on a storage device, an indication that the food product may be offered, as one of a set of one or more food products, in exchange for a round-up amount associated with a purchase if the round-up amount is in the price range.

12. An apparatus comprising:
    a processor; and
    a computer readable medium in communication with the processor, the computer readable medium storing instructions configured to direct the processor to perform:
    determining a food product;
    determining a price range defining a maximum price and a minimum price; and
    storing, on a storage device, an indication that the food product may be offered, as one of a set of one or more food products, in exchange for a round-up amount associated with a purchase if the round-up amount is in the price range.

13. A method comprising:
    determining, by a controller comprising at least one processor, an age category corresponding to a food product;
    determining, by the controller, a price range defining a maximum price and a minimum price; and
    storing, on a storage device, an indication that the food product may be offered in exchange for a round-up amount associated with a purchase if the round-up amount is in the price range and an age of the food product corresponds to the age category.

14. A computer readable medium storing instructions configured to direct a processor to perform:
    determining, by a processor, an age category corresponding to a food product;
    determining, by the processor, a price range defining a maximum price and a minimum price; and
    storing, on a storage device, an indication that the food product may be offered in exchange for a round-up amount associated with a purchase if the round-up amount is in the price range and an age of the food product corresponds to the age category.

15. An apparatus comprising:
    a processor; and
    a computer readable medium in communication with the processor, the computer readable medium storing instructions configured to direct the processor to perform:
    determining an age category corresponding to a food product;
    determining a price range defining a maximum price and a minimum price; and
    storing, on a storage device, an indication that the food product may be offered in exchange for a round-up amount associated with a purchase if the round-up amount is in the price range and an age of the food product corresponds to the age category.

16. A method comprising:
    determining, by a controller comprising at least one processor, a round-up amount, the round-up amount being a difference between a purchase price of a purchase and a rounded price;
    identifying, by the controller, a food product associated with a price range, in which the round-up amount is within the price range, in which
    identifying the food product is based on at least one of the following:
        information about a customer associated with the purchase,
        at least one characteristic of the purchase,
        a current inventory of the food product,
        respective inventory quantities of each of a plurality of food products,
        a temperature,
        a time,
        a preference for the food product,
        an indication of a promotion for the food product, and
        a weather condition; and
    offering the identified food product in exchange for the round-up amount.

17. The method of claim 16, in which identifying the food product is based on the information about the customer, and in which the information about the customer comprises at least one of the following:
    a number of people in the customer's party,
    at least one previous purchase of the customer,
    at least one offer previously accepted by the customer,
    at least one offer previously rejected by the customer,
    an age of the customer,
    a weight of the customer, and
    a gender of the customer.

18. The method of claim 16,
    in which identifying the food product is based on the at least one characteristic of the purchase, and
    in which the at least one characteristic of the purchase comprises an indication of at least one product of the purchase.

19. The method of claim 16, further comprising:
    receiving an identifier that uniquely identifies the customer; and
    accessing a previous purchase history associated with the customer based on the received identifier.

20. The method of claim 16, further comprising:
    receiving the information about the customer from an operator.

21. A computer readable medium storing instructions configured to direct a processor to perform:
    determining, by a processor, a round-up amount, the round-up amount being a difference between a purchase price of a purchase and a rounded price;
    identifying, by the processor, a food product associated with a price range, in which the round-up amount is within the price range, in which
    identifying the food product is based on at least one of the following:
        information about a customer associated with the purchase,
        at least one characteristic of the purchase,
        a current inventory of the food product,
        respective inventory quantities of each of a plurality of food products,
        a temperature,
        a time,
        a preference for the food product, an indication of a promotion for the food product, and a weather condition; and offering, via the processor, the identified food product in exchange for the round-up amount.

22. An apparatus comprising:

a processor; and a computer readable medium in communication with the processor, the computer readable medium storing instructions configured to direct the processor to perform:

determining a round-up amount, the round-up amount being a difference between a purchase price of a purchase and a rounded price;

identifying a food product associated with a price range, in which the round-up amount is within the price range, in which identifying the food product is based on at least one of the following:

information about a customer associated with the purchase, at least one characteristic of the purchase, a current inventory of the food product, respective inventory quantities of each of a plurality of food products, a temperature, a time, a preference for the food product, an indication of a promotion for the food product, and a weather condition; and offering the identified food product in exchange for the round-up amount.

* * * * *